United States Patent
Schubert et al.

(10) Patent No.: US 12,350,790 B2
(45) Date of Patent: Jul. 8, 2025

(54) MEASURING ABRASIVE FLOW RATES IN A CONDUIT

(71) Applicant: OMAX Corporation, Kent, WA (US)

(72) Inventors: Ernst H. Schubert, Snoqualmie Pass, WA (US); Kevin A. Hay, Des Moines, WA (US); Axel H. Henning, Black Diamond, WA (US)

(73) Assignee: Hypertherm, Inc., Hanover, NH (US)

( * ) Notice: Subject to any disclaimer, the term of this patent is extended or adjusted under 35 U.S.C. 154(b) by 1021 days.

(21) Appl. No.: 16/942,539

(22) Filed: Jul. 29, 2020

(65) Prior Publication Data

US 2021/0046610 A1 Feb. 18, 2021

Related U.S. Application Data

(60) Provisional application No. 62/879,995, filed on Jul. 29, 2019.

(51) Int. Cl.
    *B24C 7/00* (2006.01)
    *B24C 1/04* (2006.01)
    *B24C 5/04* (2006.01)

(52) U.S. Cl.
    CPC ............ *B24C 7/0015* (2013.01); *B24C 1/045* (2013.01); *B24C 5/04* (2013.01)

(58) Field of Classification Search
    CPC .......... B24C 7/0015; B24C 1/045; B24C 5/04
    (Continued)

(56) References Cited

U.S. PATENT DOCUMENTS

| | | |
|---|---|---|
| 773,665 A | 11/1904 | Murray |
| 1,081,071 A | 12/1913 | Westland |

(Continued)

FOREIGN PATENT DOCUMENTS

| | | |
|---|---|---|
| CN | 101357809 A | 2/2009 |
| CN | 101811287 A | 8/2010 |

(Continued)

OTHER PUBLICATIONS

Ruppenthal, Michael, "Carinox S.A. Purchases Third Waterjet Cutting Machine from Flow International Corporation" (http://www.businesswire.com/news/home/20031218005772/en/Carinox), Business Wire, Dec. 18, 2003, p. 1, Kent, WA.

(Continued)

*Primary Examiner* — Brian D Keller
*Assistant Examiner* — Jason Khalil Hawkins
(74) *Attorney, Agent, or Firm* — Perkins Coie LLP

(57) ABSTRACT

The present disclosure relates to abrasive material delivery systems for liquid jet cutting systems. The abrasive material delivery systems can include a valve configured to adjust an inflow of abrasive material into the abrasive material delivery system from a source of abrasive material. The systems can include a chamber downstream of the valve and configured to receive the inflow of abrasive material from the valve. The systems can include a metering component configured to control an outflow of abrasive from the chamber to a cutting head of the liquid jet cutting system. In some embodiments, the systems include a sensor configured to monitor movement of a top surface of a portion of abrasive material within the chamber as the top surface moves through the chamber; and a processing device operably connected to the sensor and configured to determine an abrasive flow rate through the metering component based on a speed of the top surface as monitored by the sensor.

21 Claims, 16 Drawing Sheets

(58) Field of Classification Search
USPC .......................................................... 451/2
See application file for complete search history.

(56) References Cited

U.S. PATENT DOCUMENTS

| | | |
|---|---|---|
| 1,144,556 A | 6/1915 | Lowe |
| 1,684,431 A | 9/1928 | Behee, Jr. |
| 2,359,352 A | 10/1944 | Bucknam et al. |
| 2,929,120 A | 3/1960 | Brandt et al. |
| 2,985,050 A | 5/1961 | Schwacha |
| 3,014,665 A | 12/1961 | Shames et al. |
| 3,073,070 A | 1/1963 | Mead |
| 3,137,978 A | 6/1964 | Incantalupo |
| 3,148,484 A | 9/1964 | Meek |
| 3,201,901 A | 8/1965 | Pauli |
| 3,270,464 A | 9/1966 | Bowling, Jr. et al. |
| 3,413,794 A | 12/1968 | Bell et al. |
| 3,452,412 A | 7/1969 | Allman, Jr. et al. |
| 3,507,740 A | 4/1970 | Gaspari |
| 3,543,444 A | 12/1970 | Mehta |
| 3,553,895 A | 1/1971 | Power |
| 3,593,459 A | 7/1971 | Kulischenko |
| 3,708,936 A | 1/1973 | Rogers |
| 3,769,753 A | 11/1973 | Fleischer |
| 3,834,082 A | 9/1974 | Grudzinski |
| 4,048,918 A | 9/1977 | Peck |
| 4,049,545 A | 9/1977 | Horvath |
| 4,058,986 A | 11/1977 | Granholm |
| 4,075,789 A | 2/1978 | Dremann |
| 4,109,636 A | 8/1978 | Burge |
| 4,125,969 A | 11/1978 | Easton |
| 4,164,183 A | 8/1979 | Peck |
| 4,216,906 A | 8/1980 | Olsen et al. |
| 4,253,610 A | 3/1981 | Larkin |
| 4,280,913 A | 7/1981 | Applegate et al. |
| 4,478,368 A | 10/1984 | Me |
| 4,522,597 A | 6/1985 | Gallant |
| 4,534,427 A | 8/1985 | Wang et al. |
| 4,545,157 A | 10/1985 | Saurwein |
| 4,547,286 A | 10/1985 | Hsiung |
| 4,555,872 A | 12/1985 | Me |
| 4,617,064 A | 10/1986 | Moore |
| 4,666,083 A | 5/1987 | Me |
| 4,674,239 A | 6/1987 | Jodoin |
| 4,698,940 A | 10/1987 | Zwicker |
| 4,742,623 A | 5/1988 | Meurer et al. |
| 4,785,027 A | 11/1988 | Brasington et al. |
| 4,802,312 A | 2/1989 | Glaeser et al. |
| 4,802,993 A | 2/1989 | Katoh |
| 4,815,241 A | 3/1989 | Woodson |
| 4,816,284 A | 3/1989 | Magee |
| 4,817,342 A | 4/1989 | Martin et al. |
| 4,817,874 A | 4/1989 | Jarzebowicz |
| 4,820,913 A | 4/1989 | Haddock |
| 4,821,467 A | 4/1989 | Woodson et al. |
| 4,872,293 A | 10/1989 | Yasukawa et al. |
| 4,872,975 A | 10/1989 | Benson |
| 4,878,320 A | 11/1989 | Woodson |
| 4,934,111 A | 6/1990 | Hashish et al. |
| 4,951,429 A | 8/1990 | Hashish et al. |
| 4,955,164 A | 9/1990 | Hashish et al. |
| 4,984,397 A | 1/1991 | Van Leeuwen |
| 4,993,200 A | 2/1991 | Morioka et al. |
| 4,995,202 A | 2/1991 | Gardner et al. |
| 5,018,670 A | 5/1991 | Chalmers |
| 5,081,799 A | 1/1992 | Kirschner et al. |
| 5,098,229 A | 3/1992 | Meier et al. |
| 5,107,630 A | 4/1992 | Lodewijk |
| 5,109,636 A | 5/1992 | Lloyd et al. |
| 5,176,018 A | 1/1993 | Thompson |
| 5,192,532 A | 3/1993 | Guay et al. |
| 5,201,150 A | 4/1993 | Kuboyama et al. |
| 5,203,794 A | 4/1993 | Stratford et al. |
| 5,205,998 A | 4/1993 | Boone et al. |
| 5,230,185 A | 7/1993 | Kirschner et al. |
| 5,236,459 A | 8/1993 | Koch et al. |
| 5,239,788 A | 8/1993 | Woodson |
| 5,271,255 A | 12/1993 | Thompson |
| 5,320,289 A | 6/1994 | Hashish et al. |
| 5,330,167 A | 7/1994 | Plumb |
| 5,335,459 A | 8/1994 | Dale |
| 5,352,254 A | 10/1994 | Celikkaya |
| 5,363,556 A | 11/1994 | Banholzer et al. |
| 5,407,379 A | 4/1995 | Shank et al. |
| 5,413,270 A | 5/1995 | Lechervy et al. |
| 5,415,584 A | 5/1995 | Brooke et al. |
| 5,421,766 A | 6/1995 | Shank, Jr. |
| 5,441,441 A | 8/1995 | Cook et al. |
| 5,468,066 A | 11/1995 | Hammonds |
| 5,472,367 A | 12/1995 | Slocum et al. |
| 5,484,325 A | 1/1996 | Shank |
| 5,492,497 A | 2/1996 | Brooke et al. |
| 5,508,596 A | 4/1996 | Olsen |
| 5,509,849 A | 4/1996 | Spears, Jr. |
| 5,588,901 A | 12/1996 | Rubey, III et al. |
| 5,591,064 A | 1/1997 | Spears, Jr. |
| 5,592,841 A | 1/1997 | Champaigne |
| 5,616,067 A | 4/1997 | Goenka |
| 5,637,030 A | 6/1997 | Chopra et al. |
| 5,643,058 A | 7/1997 | Erichsen et al. |
| 5,647,989 A | 7/1997 | Hayashi et al. |
| 5,649,694 A | 7/1997 | Buck |
| 5,679,058 A | 10/1997 | Rhoades |
| 5,704,824 A | 1/1998 | Hashish et al. |
| 5,730,635 A | 3/1998 | De Haas et al. |
| 5,759,086 A | 6/1998 | Klingel |
| 5,771,873 A | 6/1998 | Potter et al. |
| 5,800,246 A | 9/1998 | Tomioka |
| 5,851,139 A | 12/1998 | Xu |
| 5,876,267 A | 3/1999 | Kanda |
| 5,892,345 A | 4/1999 | Olsen |
| 5,908,349 A | 6/1999 | Warehime |
| 5,928,493 A | 7/1999 | MorkovskV et al. |
| 5,947,800 A | 9/1999 | Fring |
| 5,979,663 A | 11/1999 | Herrmann et al. |
| 6,001,265 A | 12/1999 | Toyama et al. |
| 6,077,152 A | 6/2000 | Warehime |
| 6,083,001 A | 7/2000 | Deardon et al. |
| 6,098,677 A | 8/2000 | Wegman et al. |
| 6,099,388 A | 8/2000 | Fritsch et al. |
| 6,120,351 A | 9/2000 | Zeng |
| 6,136,386 A | 10/2000 | Nakahigashi et al. |
| 6,155,245 A | 12/2000 | Zanzuri |
| 6,168,503 B1 | 1/2001 | Pao et al. |
| 6,200,203 B1 | 3/2001 | Xu et al. |
| 6,227,768 B1 | 5/2001 | Higuchi et al. |
| 6,248,369 B1 | 6/2001 | Nier et al. |
| 6,276,993 B1 | 8/2001 | Miller |
| 6,280,302 B1 | 8/2001 | Hashish et al. |
| 6,283,833 B1 | 9/2001 | Pao et al. |
| 6,299,510 B1 | 10/2001 | Massenburg |
| 6,328,638 B1 | 12/2001 | Hopkins et al. |
| 6,346,197 B1 | 2/2002 | Stephenson et al. |
| 6,361,416 B1 | 3/2002 | Hopkins et al. |
| 6,375,547 B1 | 4/2002 | Massenburg |
| 6,390,898 B1 | 5/2002 | Pieper |
| 6,425,804 B1* | 7/2002 | Pettit ..................... B24B 57/04 451/75 |
| 6,533,640 B1 | 3/2003 | Nopwaskey et al. |
| 6,533,643 B1 | 3/2003 | Feng |
| 6,548,173 B2 | 4/2003 | Erdemir et al. |
| 6,607,670 B2 | 8/2003 | Baldwin et al. |
| 6,676,039 B2 | 1/2004 | Lindsey et al. |
| 6,746,593 B2 | 6/2004 | Herbst |
| 6,752,685 B2 | 6/2004 | Ulrich et al. |
| 6,804,459 B2 | 10/2004 | Raghavan et al. |
| 6,922,605 B1 | 7/2005 | Olsen |
| 6,932,285 B1 | 8/2005 | Zeng |
| 6,970,793 B2 | 11/2005 | Pearson et al. |
| 7,014,770 B2 | 3/2006 | Umezawa et al. |
| 7,035,708 B1 | 4/2006 | Olsen |
| 7,040,959 B1 | 5/2006 | Panuska et al. |
| 7,074,112 B2 | 7/2006 | Olsen |
| 7,090,054 B2 | 8/2006 | Iwamasa et al. |

(56) References Cited

U.S. PATENT DOCUMENTS

| | | |
|---|---|---|
| 7,094,135 B2 | 8/2006 | Chisum et al. |
| 7,108,585 B1 | 9/2006 | Dorfman et al. |
| 7,138,063 B1 | 11/2006 | Teter et al. |
| 7,153,186 B2 | 12/2006 | Popescu et al. |
| 7,419,418 B2 | 9/2008 | Alberts et al. |
| 7,465,215 B2 | 12/2008 | Shimizu et al. |
| 7,485,027 B2 | 2/2009 | Miller |
| 7,524,233 B1 | 4/2009 | Reilley |
| 7,549,911 B2 | 6/2009 | Nguyen |
| 7,585,201 B2 | 9/2009 | Kanai et al. |
| 7,758,742 B2 | 7/2010 | Powell |
| 7,815,490 B2 | 10/2010 | Liu |
| 7,959,790 B2 | 6/2011 | Woytowich et al. |
| 7,980,923 B2 | 7/2011 | Olmo et al. |
| 7,981,301 B2 | 7/2011 | Powell |
| 8,048,279 B2 | 11/2011 | Powell et al. |
| 8,123,591 B2 | 2/2012 | Olsen |
| 8,308,525 B2 | 11/2012 | Hashish et al. |
| 8,342,912 B2 | 1/2013 | Funatsu et al. |
| 8,475,230 B2 | 7/2013 | Summers et al. |
| 8,593,086 B2 | 11/2013 | Hay et al. |
| 8,821,213 B2 | 9/2014 | Liu et al. |
| 8,892,236 B2 | 11/2014 | Olsen |
| 8,904,912 B2 | 12/2014 | Raghavan et al. |
| 8,920,213 B2 | 12/2014 | Liu |
| 9,003,955 B1 | 4/2015 | Stang et al. |
| 9,011,204 B2 | 4/2015 | Raghavan et al. |
| 9,044,873 B2 | 6/2015 | Guglielmetti et al. |
| 9,050,704 B1 | 6/2015 | Liu et al. |
| 9,067,331 B2 | 6/2015 | Stang |
| 9,090,808 B1 | 7/2015 | Liu et al. |
| 9,095,955 B2 | 8/2015 | Raghavan et al. |
| 9,108,297 B2 | 8/2015 | Schubert et al. |
| 9,138,863 B2* | 9/2015 | Schubert ................ B24C 1/045 |
| 9,193,036 B2 | 11/2015 | Kanazawa et al. |
| 9,273,682 B2 | 3/2016 | Stang |
| 9,283,656 B2 | 3/2016 | Schubert et al. |
| 9,370,871 B2 | 6/2016 | Hashish et al. |
| 9,492,908 B2 | 11/2016 | Schubert et al. |
| 9,586,306 B2 | 3/2017 | Zhang et al. |
| 9,610,674 B2 | 4/2017 | Raghavan et al. |
| 9,636,799 B2 | 5/2017 | Liu et al. |
| 9,638,357 B1 | 5/2017 | Raghavan et al. |
| 9,649,744 B2 | 5/2017 | Raghavan et al. |
| 9,658,613 B2 | 5/2017 | Henning et al. |
| 9,720,399 B2 | 8/2017 | Henning et al. |
| 9,727,051 B2 | 8/2017 | Henning et al. |
| 9,772,620 B2 | 9/2017 | Henning et al. |
| 9,810,205 B2 | 11/2017 | Raghavan et al. |
| 9,827,649 B2 | 11/2017 | Schubert et al. |
| 9,891,617 B2 | 2/2018 | Henning et al. |
| 9,976,675 B1 | 5/2018 | Raghavan et al. |
| 9,989,954 B2 | 6/2018 | Henning et al. |
| 10,010,999 B2 | 7/2018 | Raghavan et al. |
| 10,048,676 B2 | 8/2018 | Henning et al. |
| 10,146,209 B2 | 12/2018 | Henning et al. |
| 10,201,914 B2 | 2/2019 | Schlough et al. |
| 10,564,627 B2 | 2/2020 | Henning et al. |
| 10,606,240 B2 | 3/2020 | Henning et al. |
| 10,642,252 B2 | 5/2020 | Henning et al. |
| 10,656,622 B2 | 5/2020 | Henning et al. |
| 10,675,733 B2 | 6/2020 | Zhang et al. |
| 10,780,551 B2 | 9/2020 | Zhang et al. |
| 10,801,651 B2 | 10/2020 | Olsen et al. |
| 10,808,688 B1 | 10/2020 | Raghavan et al. |
| 10,981,259 B2 | 4/2021 | Lerea et al. |
| 11,224,987 B1 | 1/2022 | Guglielmetti |
| 11,577,366 B2 | 2/2023 | Schubert et al. |
| 2001/0030245 A1 | 10/2001 | Lindsey et al. |
| 2001/0046833 A1 | 11/2001 | Hashish et al. |
| 2002/0028634 A1 | 3/2002 | Massenburg |
| 2003/0034122 A1 | 2/2003 | Asai |
| 2003/0044380 A1 | 3/2003 | Zhu et al. |
| 2003/0085295 A1 | 5/2003 | Dijkman et al. |
| 2003/0166378 A1 | 9/2003 | Fuksshimov et al. |
| 2003/0224704 A1 | 12/2003 | Shank |
| 2004/0107810 A1 | 6/2004 | Sciulli et al. |
| 2004/0132383 A1 | 7/2004 | Langford et al. |
| 2004/0198179 A1 | 10/2004 | Gadd |
| 2005/0017091 A1 | 1/2005 | Olsen et al. |
| 2005/0070205 A1 | 3/2005 | Korovin et al. |
| 2005/0186888 A1 | 8/2005 | Gadd |
| 2005/0239371 A1 | 10/2005 | Togawa |
| 2006/0219825 A1 | 10/2006 | Rohring et al. |
| 2006/0223423 A1 | 10/2006 | Dorfman et al. |
| 2007/0015442 A1 | 1/2007 | Shin |
| 2007/0021039 A1 | 1/2007 | Haslett |
| 2007/0037495 A1* | 2/2007 | Matsubara ............ B24C 9/006 |
| | | 451/75 |
| 2007/0128988 A1 | 6/2007 | Rivir et al. |
| 2007/0131455 A1 | 6/2007 | Blange |
| 2007/0154561 A1 | 7/2007 | Takeda et al. |
| 2007/0155289 A1 | 7/2007 | Miller |
| 2007/0218808 A1 | 9/2007 | Shimizu et al. |
| 2008/0060493 A1 | 3/2008 | Liu |
| 2008/0110311 A1 | 5/2008 | Stangherlin |
| 2008/0145156 A1 | 6/2008 | Livingood et al. |
| 2009/0042492 A1 | 2/2009 | Hashish |
| 2009/0064832 A1 | 3/2009 | Caretta et al. |
| 2009/0214628 A1 | 8/2009 | de Rijk |
| 2009/0229793 A1 | 9/2009 | Treb et al. |
| 2009/0258582 A1 | 10/2009 | Miller |
| 2009/0311944 A1 | 12/2009 | Olsen |
| 2009/0318064 A1 | 12/2009 | Hashish |
| 2010/0003894 A1 | 1/2010 | Miller et al. |
| 2010/0124872 A1 | 5/2010 | Hashish et al. |
| 2010/0269593 A1 | 10/2010 | Moser et al. |
| 2011/0008964 A1 | 1/2011 | Hughes |
| 2011/0214757 A1 | 9/2011 | Igarashi |
| 2011/0269382 A1 | 11/2011 | Deleris |
| 2012/0021676 A1 | 1/2012 | Schubert et al. |
| 2012/0085211 A1 | 4/2012 | Liu et al. |
| 2012/0145647 A1 | 6/2012 | Volkel et al. |
| 2012/0156969 A1 | 6/2012 | Liu |
| 2012/0160706 A1 | 6/2012 | Poirier et al. |
| 2012/0196516 A1 | 8/2012 | Funatsu et al. |
| 2012/0252325 A1 | 10/2012 | Schubert et al. |
| 2012/0252326 A1* | 10/2012 | Schubert ............ B24C 7/0007 |
| | | 451/60 |
| 2012/0282845 A1 | 11/2012 | Whang et al. |
| 2013/0005225 A1 | 1/2013 | Russo |
| 2013/0025425 A1 | 1/2013 | Knaupp et al. |
| 2013/0105717 A1 | 5/2013 | Nguyen |
| 2013/0267152 A1 | 10/2013 | Tera et al. |
| 2014/0045409 A1 | 2/2014 | Zhang et al. |
| 2014/0087635 A1 | 3/2014 | Ogawa et al. |
| 2014/0213150 A1 | 7/2014 | Schubert et al. |
| 2014/0273768 A1 | 9/2014 | Guglielmetti et al. |
| 2015/0031270 A1 | 1/2015 | Miller |
| 2015/0336239 A1 | 11/2015 | Liu et al. |
| 2016/0325401 A1 | 11/2016 | Meyer |
| 2017/0059058 A1 | 3/2017 | Hemme |
| 2017/0165810 A1 | 6/2017 | Zhang et al. |
| 2017/0190021 A1 | 7/2017 | Zhang et al. |
| 2017/0225297 A1 | 8/2017 | Trull, Jr. et al. |
| 2017/0297168 A1 | 10/2017 | Raghavan et al. |
| 2018/0104843 A1* | 4/2018 | Adams ................ B26F 3/004 |
| 2018/0161958 A1 | 6/2018 | Schubert et al. |
| 2018/0197018 A1 | 7/2018 | Nakasu et al. |
| 2018/0264625 A1* | 9/2018 | Schneidau ............ B24C 7/0053 |
| 2018/0320802 A1 | 11/2018 | Raghavan et al. |
| 2018/0364679 A1 | 12/2018 | Henning et al. |
| 2019/0101894 A1 | 4/2019 | Henning et al. |
| 2019/0249805 A1 | 8/2019 | Olsen et al. |
| 2020/0007254 A1 | 1/2020 | Hay et al. |
| 2020/0406424 A1 | 12/2020 | Zhang et al. |
| 2021/0107113 A1* | 4/2021 | Linde .................... B24C 1/045 |
| 2021/0107114 A1* | 4/2021 | Linde .................... B24C 7/0007 |

(56) References Cited

U.S. PATENT DOCUMENTS

| | | |
|---|---|---|
| 2021/0187778 A1 | 6/2021 | Denney et al. |
| 2023/0143795 A1 | 5/2023 | Schubert et al. |

FOREIGN PATENT DOCUMENTS

| | | |
|---|---|---|
| CN | 201785277 U | 4/2011 |
| CN | 102139978 B | 8/2011 |
| CN | 202415300 U | 9/2012 |
| EP | 0165690 A2 | 12/1985 |
| EP | 0761603 A1 | 3/1997 |
| FR | 2452696 A1 | 10/1980 |
| GB | 2198975 A | 6/1988 |
| GB | 2483740 A | 3/2012 |
| JP | 2012157956 A | 8/2012 |
| KR | 1019930008692 B1 | 9/1993 |
| KR | 101678356 B1 | 11/2016 |
| WO | 2002085572 A1 | 10/2002 |
| WO | 2003011524 A1 | 2/2003 |
| WO | 03055644 A1 | 7/2003 |
| WO | 2009050251 A2 | 4/2009 |
| WO | 2010122336 A2 | 10/2010 |
| WO | 2017134242 A1 | 8/2017 |
| WO | 2018197018 A1 | 11/2018 |

OTHER PUBLICATIONS

Operation Manual Abrasive Delivery System Type ADS-24-11, Straaltechniek International B.V., © Flow Europe GmbH, Jul. 2000, 28 pages, The Netherlands.

Bakalar, Tomas et al., "Heavy metal removal using reverse osmosis", Acta Montanistica Slovaca Rocnik 14 (2009), cislo 3, 250-253.

Hashish, M., "Waterjet Machine Tool of the Future", 9th American Waterjet Conference, Aug. 23-26, 1997, Paper 58, 15 pages.

Tsai, Feng-Che et al., "Abrasive jet polishing of micro groove using compound SiC abrasives with compound additives", Advanced Materials Research vols. 481-420 (2012), pp. 2153-2157, © 2012 Trans Tech Publications, Switzerland.

Fox Solids Conveying Educators, http://www.flowmeterdirectory.com/solid-conveying-eductor.html, accessed May 24, 2011, 2 pages.

Hashish, Porter Cable Pancake Compressor Instruction Manual, 2006, 66 pages.

European Patent Office International Search Authority, International Search Report and Written Opinion mailed Jan. 18, 2021 for PCT/US2020/044093 filed Jul. 29, 2020, Applicant: OMAX Corporation, 23 pages.

\* cited by examiner

_MEASURING ABRASIVE FLOW RATES IN A CONDUIT_

The present application claims priority to U.S. Provisional App. No. 62/879,995, titled MEASURING OF FLOW RATES OF ABRASIVE MATERIALS IN A CONDUIT, filed Jul. 29, 2019, the entire disclosure of which is hereby incorporated herein by reference and made part of the present disclosure.

TECHNICAL FIELD

The present disclosure relates to systems and methods for abrasive delivery, including systems and methods for calculating flow parameters of abrasive delivery.

BACKGROUND

Abrasive material or powders can be used in a number of settings, including in liquid (e.g., water) jet cutting. Liquid jet cutting is utilized to cut a wide-variety of materials using a high-pressure jet of liquid. Abrasive material can be added to the liquid jet to further facilitate the cutting of certain materials. Abrasive or powders can be fed in both fixed amounts and variable quantities to a cutting device such as an abrasive liquid jet cutting head. However, few methods exist to accurately estimate and control the amount of abrasive used. The most commonly used method is to operate the system in a simulated cutting mode (e.g., while not actually cutting a part) for a period of time and collecting a sample of abrasive discharged from the feed system over that specific time interval and weighing the sample to determine the feed rate per unit of time.

DETAILED DESCRIPTION

Figure 1:
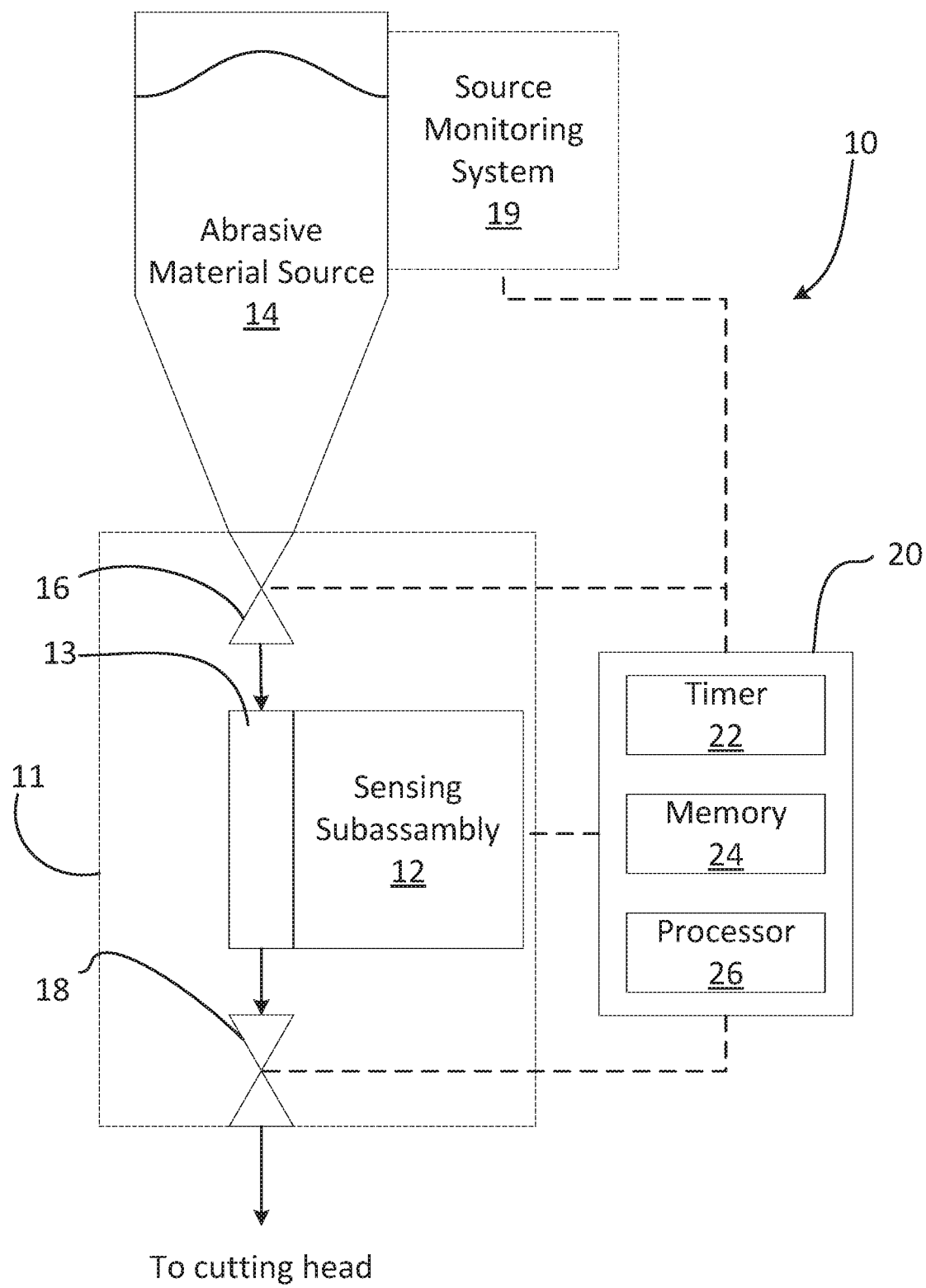
FIG. 1 is a schematic illustration of an abrasive material delivery system having an abrasive material monitoring system for measuring and managing a flow of abrasive material in accordance with some embodiments of the present technology.

The following disclosure describes various embodiments of abrasive material delivery systems for high-pressure liquid jet cutting systems, abrasive material monitoring systems, and associated methods of manufacture and use. Such systems can, in some instances, have abrasive material consumption rates in the order of about 0.5-2 pounds of abrasive material per minute. The systems and methods of the present disclosure are capable of measuring such rates, as well as rates outside of the above-recited range. In some embodiments, the present disclosure provides systems and methods for calculating abrasive flow rates which are a contributing portion of a liquid jet cutting system. For example, the devices, systems, and methods of the present disclosure can measure abrasive flow rates (e.g., volumetric flow rates, mass flow rates, etc.) by measuring the speed of a column of abrasive flowing through a conduit. For example, certain embodiments of the present disclosure include sensor assemblies that can detect the time it takes for the column of abrasive material to flow past at least two sensor positions spaced apart by a known distance. Other embodiments include a single sensor configured to detect a top of a column of abrasive material at, for example, two positions, one downstream from the other, in the conduit. In still other embodiments, one or more sensors are configured to detect motion of the top of the column of abrasive material as the abrasive material moves through the conduit or other chamber. By knowing: the spacing between the sensors (and/or the spacing between the two detected positions of the top of the column of abrasive material), the geometry of the conduit, and the time it takes for the top of the column to sequentially pass both sensors (and/or to progress from the first detected position to the second detected position), a volumetric flow rate can be calculated. Given the density of the material in the conduit, a mass flow rate can also be calculated.

The systems described herein can be configured to operate in a "closed loop" configuration in which the measured abrasive material flow rates are used to adjust operating parameters to achieve desired results. For example, should flow rate be lower than expected, the system can alert an operator to possible malfunctions downstream of the sensors. In some instances, lower abrasive material flow rates may indicate that less abrasive material is needed for a given cutting project, in which case the abrasive material flow rate can be reduced within the system. One or more controllers may be used to control operation of the system and/or analyze the measured parameters detected by the system. These controllers can include one or more processors, and/or timers configured to control operation of the system in accordance with computer executable instructions stored on computer-readable memory.

Being able to dynamically measure the flow of abrasive material into an abrasive cutting head can allow for more accurate control over operational parameters relating to cutting conditions and allow for more optimized cutting and increased accuracy of resulting parts. It can also remove the need for the liquid jet operator to periodically manually measure abrasive flow rates and input them into the control software. In the case of a variable abrasive feed, direct measurement of the abrasive flow rate can allow closed loop control of the system. Closed loop control can ensure repeatability of the cutting process, compensate for wear, decrease the cost of excess abrasive consumption, and disclose fault conditions.

The terminology used in the description presented below is intended to be interpreted in its broadest reasonable manner, even though it is being used in conjunction with a detailed description of certain specific embodiments of the present disclosure. Certain terms may even be emphasized below; however, any terminology intended to be interpreted in any restricted manner will be overtly and specifically defined as such in this Detailed Description section. Additionally, the present disclosure can include other embodiments that are within the scope of the claims, but are not described in detail with respect to FIGS. 1-16.

Reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features or characteristics may be combined in any suitable manner in one or more embodiments.

Embodiments of the present technology include abrasive material delivery systems (e.g., for use with an abrasive liquid jet cutting system). The abrasive material delivery systems can include an abrasive material monitoring system, which can include an upstream shut off valve (e.g., a Bimba® valve, a pinch-type valve, etc.), a conduit or other chamber of known dimensions downstream of the shut off valve, and one or more sensors (e.g., emitters and detectors, such as an optical emitter and detector, ultrasonic sensors, capacitive sensors, etc.) spaced axially apart at fixed, known distances adjacent the conduit. In some embodiments, the conduit is straight. The conduit can be aligned vertically (e.g., aligned with the direction of earth's gravitational pull) or offset at a non-zero angle with respect to vertical. In some embodiments, the conduit includes one or more bands or curves. As will be described in more detail below, the conduit can be transparent and/or the sensors can be able to penetrate the conduit if the conduit is opaque or is otherwise not transparent. In some embodiments, the sensors can be inserted through openings in a sidewall of the conduit and adjacent to and/or in direct contact with the abrasive. Embodiments of the present technology can be used in conjunction with both fixed and variable abrasive delivery systems.

The devices, systems, and methods of the present disclosure can provide an output signal in closed loop feedback to one or more components of the abrasive material delivery system and/or to a controller. This output signal (e.g., a measured abrasive material flow rate) can be used to adjust operating parameters of a cutting controller and/or to adjust the abrasive flow rate to maintain a desired flow rate. In the case of a variable abrasive material delivery system, the desired flow rate could be set locally on the flow rate controller or sent from a remote controller.

In some embodiments, once initially calibrated, the user would no longer need to shut down the liquid jet cutting system to take samples by a "collect and weigh" method to adjust the abrasive flow rate parameter. In some embodiments, though, it may be desirable to periodically collect portions of abrasive flow and weigh the abrasive. For example, certain periodic checks and/or calibrations may be desirable (e.g., when conditions change). Such measurement can occur during and not interfere with normal cutting operations. For example, the measurement can occur between individual cuts in a given cutting operation and/or during a single cut.

As illustrated in FIG. 1, an abrasive material delivery system 10 (e.g., an abrasive feed management system or other system configured to provide, control and/or monitor flow of abrasive material) can include an abrasive material monitoring system 11. The abrasive material monitoring system 11 can include a sensing subassembly 12 having one or more sensors. The sensing subassembly 12 can be connected to or otherwise associated with one or more conduits 13 or chambers configured to transfer or convey abrasive material. The abrasive material monitoring system 11 can be configured to receive abrasive material from an abrasive material source 14. The abrasive material source 14 could be, for example, a hopper or other suitable source of abrasive material. The abrasive material monitoring system 11 can include a first valve 16 or other metering component configured to regulate (e.g., close, open, increase, and/or decrease) flow of abrasive material from the abrasive material source 14 to a conduit of the abrasive material monitoring system 11 (e.g., to the conduit 13 of the abrasive material monitoring system 11). The first valve 16 can be an ON/OFF valve configured to transition between open and closed configurations in response to command from another component in the system. In some embodiments, the first valve 16 is configured transition between a fully closed configuration, a fully opened configuration, and any opened configuration therebetween in response to commands from other components. In some embodiments, the abrasive material delivery system 10 includes a second valve 18 or other metering component positioned downstream of the conduit 13. The second valve 18 can be configured to regulate flow of abrasive material from the abrasive material monitoring system 11 to a cutting head or other component downstream of the second valve 18. The second valve 18 can be an ON/OFF valve configured to transition between open and closed configurations in response to command from another component (e.g., a processor or controller) in the system. In some embodiments, the second valve 18 is configured transition between a fully closed configuration, a fully opened configuration, and any opened configuration therebetween in response to commands from other components (e.g., a variable and/or adjustable abrasive feed system). In some embodiments, a fixed-orifice component is used instead of a second valve 18. The fixed-orifice component can be configured to deliver abrasive material from the conduit to downstream components (e.g., a cutting head) at a constant or substantially constant rate. For example, the fixed-orifice component can be an hourglass shaped feed device that is not adjustable.

The abrasive material delivery system 10 can include an abrasive material source monitoring system 19 configured to monitor flow rate of abrasive material or other characteristics of the abrasive material within the abrasive material source 14. The abrasive material source monitoring system 19 can operate using similar or identical functionality as the abrasive material monitoring system 11. Further details of an embodiment of the abrasive material source monitoring system 19 are described below with respect to FIG. 12.

With continued reference to FIG. 1, the abrasive material delivery system 10 can include one or more controllers 20 or other control systems. The controller 20 can include one or more timers 22 or other components configured to receive signals from the sensing subassembly 12 (e.g., signals from the one or more sensors) and to monitor and/or record timing between those signals. The controller 20 can include one or more memory devices 24. The memory devices 24 can carry programmed instructions adapted to cause one or more components of the abrasive material delivery system 10 to perform various functions. The controller 20 can include one or more processors 26 or other computing devices configured to execute instructions from the memory devices 24 and/or otherwise manage data, functionality, or other features of the abrasive material delivery system 10. As indicated by the broken lines in FIG. 1, the controller 20 can be operably coupled with various components and subsystems of the abrasive material delivery system 10. For example, the controller 20 and any subcomponents thereof can be operably connected to the valves 16, 18, to the abrasive material monitoring system 11, and/or to the abrasive source monitoring system 19.

Figure 2:
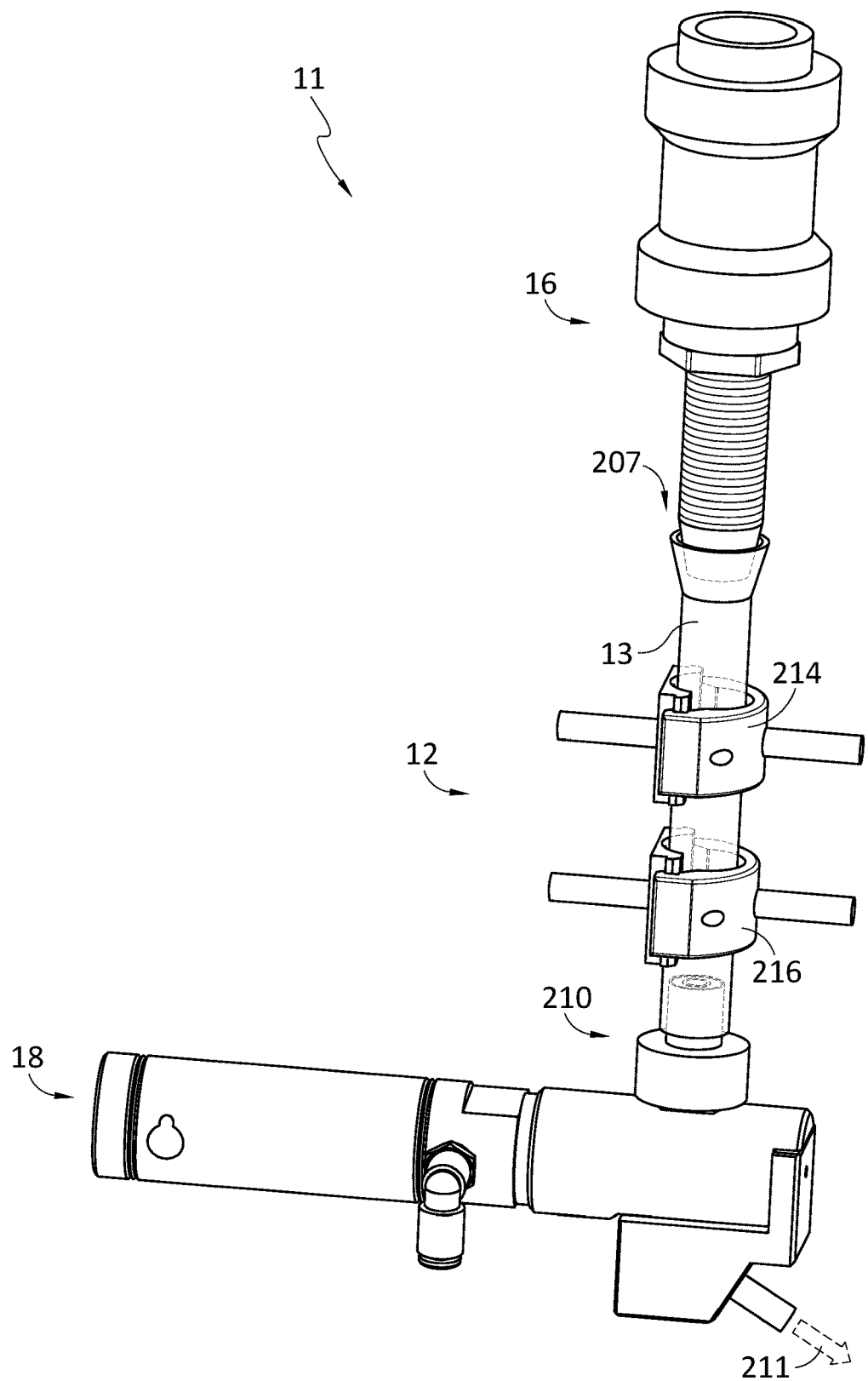
FIG. 2 is an isometric view of an abrasive material monitoring system configured in accordance with an embodiment of the present technology.

FIG. 2 is an isometric view of the abrasive material monitoring system 11 configured in accordance with an embodiment of the present disclosure. The abrasive material monitoring system 11 can be configured to receive abrasive material from, for example, a local abrasive material source (e.g., the abrasive material source 14 of FIG. 1, a storage hopper, etc.; not illustrated in FIG. 2) for housing a volume of abrasive. The abrasive material monitoring system 11 can include a conduit 13 (e.g., a drop tube or other chamber) fluidly connected to the local storage hopper and configured to receive abrasive from the local storage hopper. The conduit 13 can be transparent (e.g., constructed from a transparent or semi-transparent material, such as polyurethane, Tygothane or Sapphire), translucent, opaque, or comprise regions of varying transparency and opacity. Opaque materials can be used, for example, in embodiments where the sensor(s) penetrate the walls of the conduit 13.

The abrasive material monitoring system 11 can further include a first valve 16 connected to an upstream end portion 207 of the conduit 13. The first valve 16 can be configured to control inflow of abrasive material from the hopper to the conduit 13. For example, when the first valve 16 is in a partially opened or fully opened configuration, abrasive material can flow from the hopper to the conduit 13. When the first valve 16 is in a closed position, abrasive material can no longer flow from the hopper to the conduit 13. In variable abrasive material feed systems, the first valve 16 can be configured to operate in a plurality of partially opened configurations to modify the abrasive material flow rate from the hopper or other abrasive material source to the conduit 13. The first valve 16 can be configured to fluctuate the inflow of abrasive material into the conduit. For example, the first valve 16 can transition between the closed configuration and one or more opened configurations. In some embodiments, the abrasive material monitoring system 11 can include a flow conditioner positioned between the first valve 16 and the first sensor assembly 214 (as described in detail below with respect to FIGS. 8A-C).

With further reference to FIG. 2, the abrasive material monitoring system 11 can also include a second valve 18 or other metering device. The second valve 18 can be positioned along the conduit 13 downstream of the first valve 16. The second valve 18 can be, for example, a solenoid, a fixed orifice device, variable fluidizer, variable orifice device, abrasive wheel, belt feeder, a pneumatic component, a vibratory feed component, or other device configured to control the outflow of abrasive material from the conduit. Example fluidizers can be found in U.S. Pat. No. 9,283,656, titled SYSTEMS AND METHODS FOR FLUIDIZING AN ABRASIVE MATERIAL and issued Mar. 15, 2016, the entire disclosure of which is incorporated by reference herein and made part of the present disclosure. The second valve 18 can be connected to a downstream end portion 210 of the conduit 13. The second valve 18 can be configured to control the amount of abrasive entering a cutting stream via the cutting head, as indicated by the arrow 211 of FIG. 2.

Figure 7:
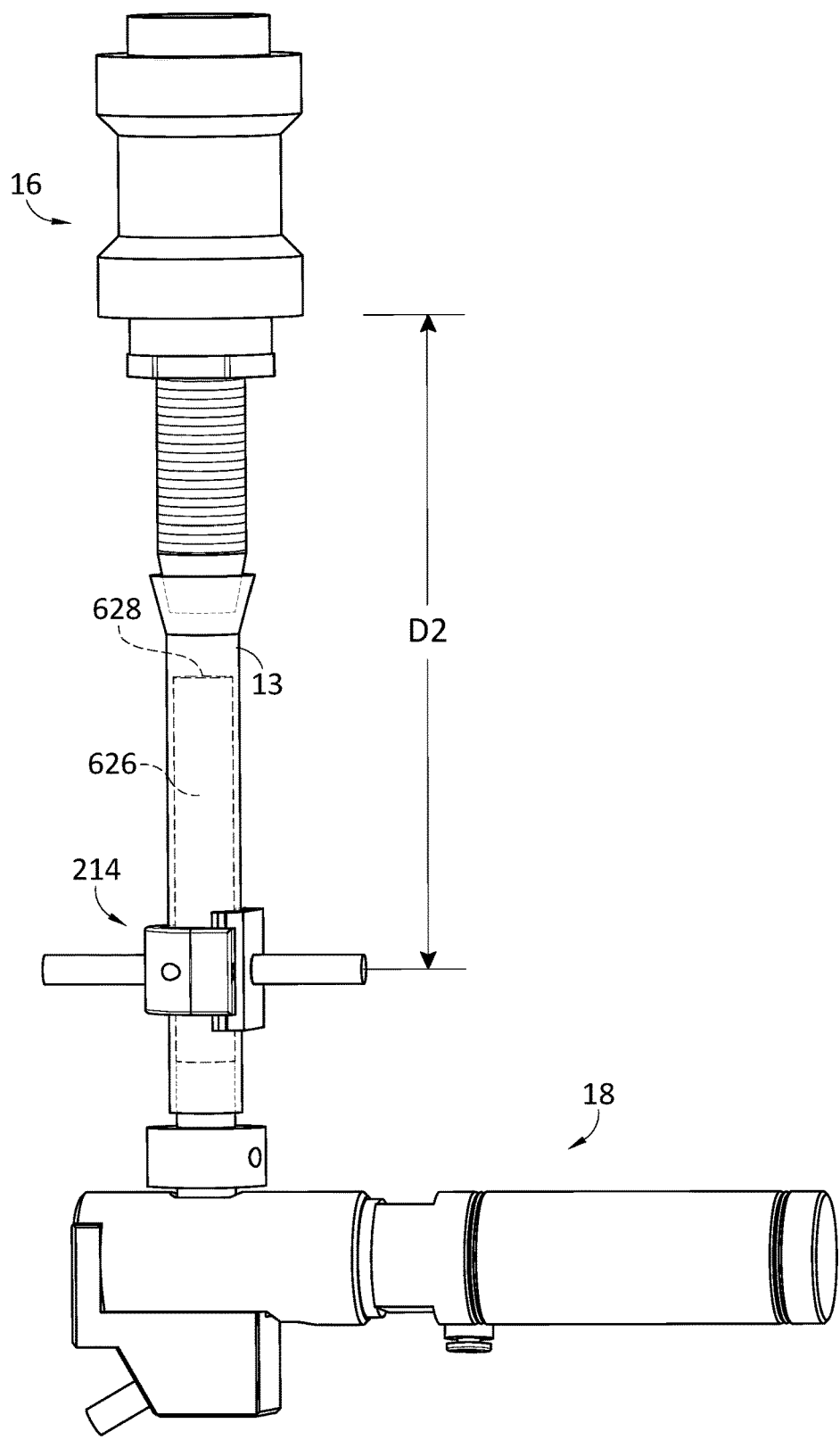
FIG. 7 is an isometric view of a column of abrasive positioned in a portion of an abrasive material monitoring system configured in accordance with another embodiment of the present technology to measure flow rate using a single sensor assembly.

As noted above with reference to FIG. 1, the abrasive material monitoring system 11 can further include the sensor subassembly 12. The sensor subassembly 12 can include one or more sensor assemblies 214, 216. Each sensor assembly 214, 216 can include, for example, one or more sensors configured to detect abrasive material. The sensors can be optical (e.g., motion sensors, photo sensors, light sensors, etc.), capacitive, or other types of sensors that can detect the movement, presence, and/or absence of abrasive in the conduit 13. Example sensor types include, but are not limited to a capacitive sensor, a radar sensor, a diode, a diode array, a laser (time of flight or dot-following), a magnetic sensor, or a set of cameras. In some embodiments, one or more of the sensors are a laser dot emitter and detector assembly, wherein a laser beam is projected onto the top surface of the abrasive column and the detector assembly is configured to sense the position of a dot formed by the laser beam on the top surface of the abrasive column The sensor assemblies 214, 216 can be positioned along the abrasive flow path downstream of (e.g., below) the local abrasive material source and spaced apart by a known separation distance. For example, the sensor assemblies 214, 216 can be positioned along part of the conduit 13 and/or along an insert positioned between the conduit 13 and the second valve 18 or between the conduit 13 and the abrasive material source. A single sensor assembly capable of detecting the top edge of the abrasive column may also be utilized at a known distance from an upstream valve (as shown in FIG. 7).

The sensors can be configured in various arrangements. For example, the sensor assemblies 214, 216 may or may not penetrate (e.g., physically or optically penetrate) the walls of the conduit 13 and may or may not be removable from the conduit 13. In certain embodiments, the sensor assemblies 214, 216 can be adjustable such that the distance between the sensor assemblies 214, 216 can be altered. In some embodiments, two or more sensors can be mounted in a single housing. In other embodiments, the sensor assemblies 214, 216 are integrally manufactured with the abrasive material monitoring system 11 (e.g., the conduit 13). In some embodiments, an existing abrasive material conduit 13 can be retrofitted to include sensor assemblies 214, 216 in accordance with the present disclosure.

The sensor assemblies 214, 216 can be operably coupled to a controller similar to or the same as the controller 20 described above with reference to FIG. 1. The controller can be configured to send and receive signals to and from the sensor assemblies 214, 216 (e.g., receive measurements or readings from the sensors) either locally or remotely. In some embodiments, for example, the sensor assemblies 214, 216 can be wirelessly connected to the controller by any means known in the art (e.g., via Bluetooth®, Wi-Fi®, etc.). In some embodiments, the controller can be connected to the sensor assemblies 214, 216 via a wired connection. The controller can be operably coupled to the first valve 16 and/or to the second valve 18. Accordingly, in some embodiments, the controller can control operation of the first valve 16, directing the first valve 16 to operate in configurations between and including fully closed and fully open.

Figure 3:
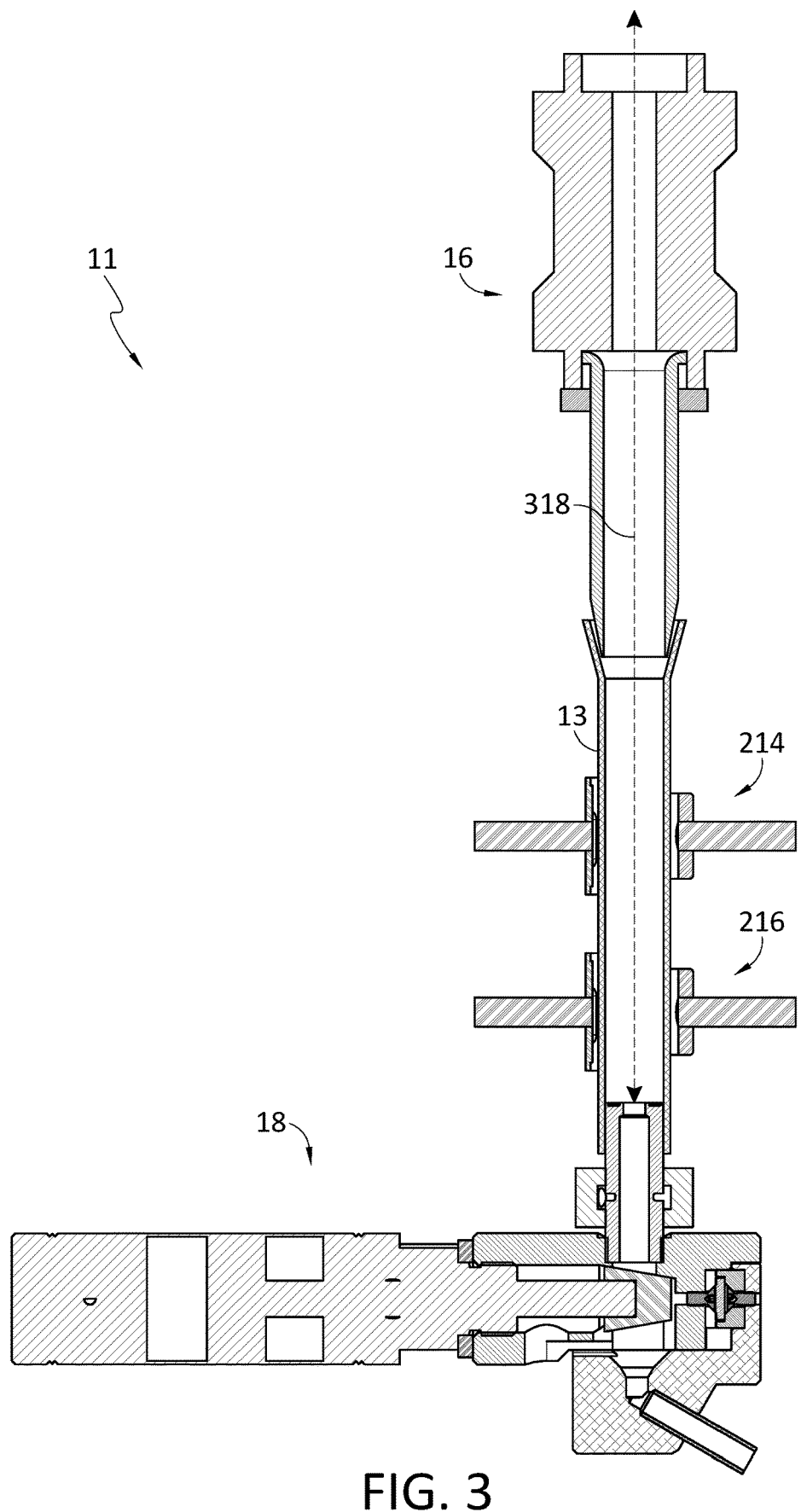
FIG. 3 is a cross-sectional side view of the abrasive material monitoring system of FIG. 2.

FIG. 3 is a cross-sectional view of an embodiment of the abrasive material monitoring system 11. This cross-sectional view illustrates that the abrasive material monitoring system 11 can have an abrasive material flow path 318 extending from the second valve 18 through the first valve 16. The flow path 318 can be straight and/or vertical. In some embodiments, the flow path 318 includes one or more bends, turns, corners, and/or other non-straight features. Maintaining a straight and vertical abrasive material flow path 318 can allow abrasive material to pass through the first valve 16, through the conduit 13, and/or past the sensor assemblies 214, 216 under/via the force of gravity. In some embodiments, the abrasive material monitoring system 11 includes one or more flow enhancement devices configured to supplement or replace the force of gravity as the driving force for moving abrasive material to the second valve 18. For example, the abrasive material monitoring system 11 can include one or more pumps, vacuums, and/or other devices configured to moderate pressure within the conduit 13.

Figure 4A:
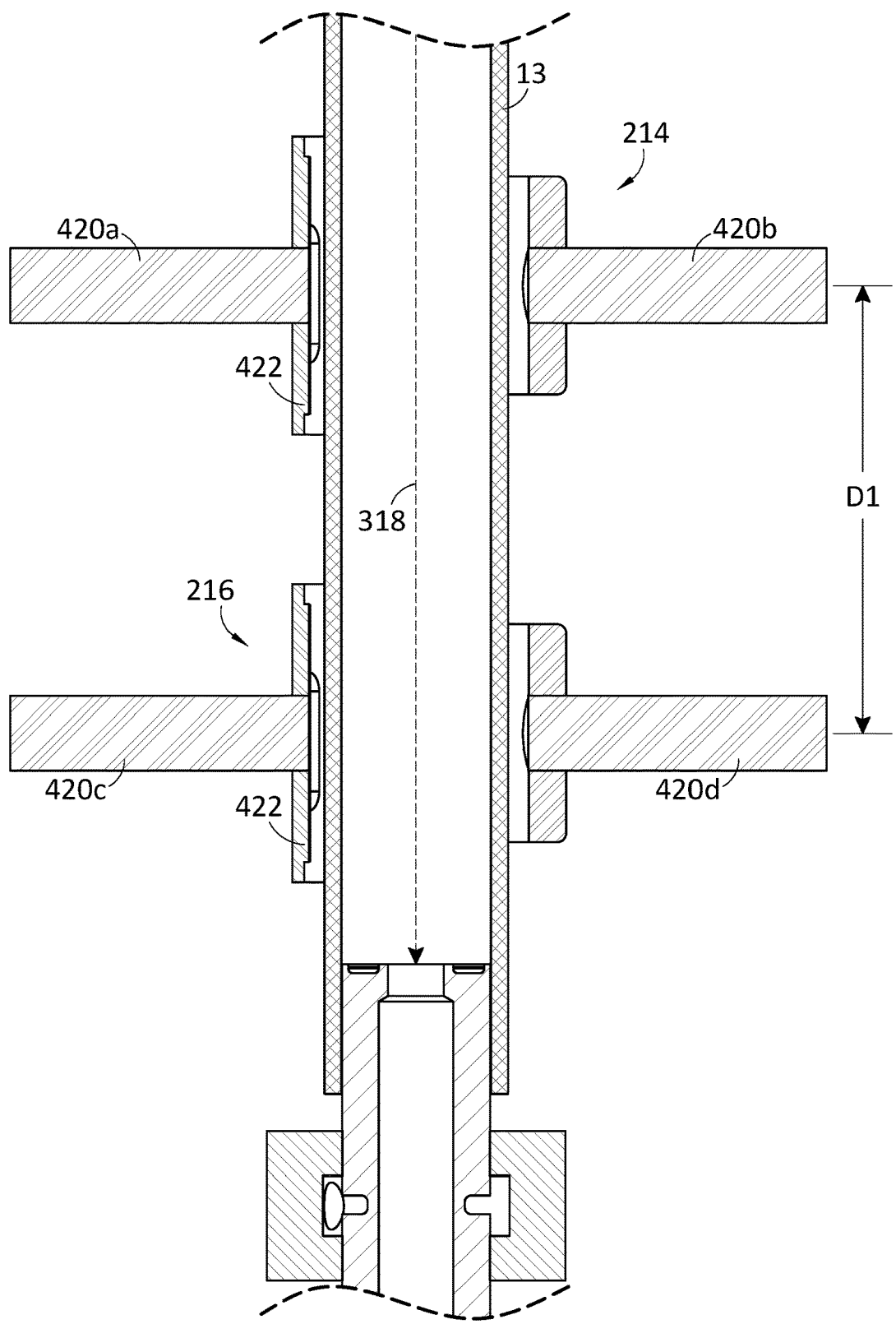
FIG. 4A is an enlarged partial cross-sectional view of a portion of the abrasive material monitoring system of FIG. 2.

FIG. 4A is an enlarged partial cross-sectional view of the sensor assemblies 214, 216 installed on the conduit 13 and configured in accordance with an embodiment of the present disclosure. One or both of the sensor assemblies 214, 216 can include one or more sensors 420a-d (collectively "420"). For example, the first sensor assembly 214 can include a first sensor 420a and a second sensor 420b. The first sensor assembly 214 can include a clamp 422 or other coupling mechanism configured to connect the first sensor assembly 214 to the conduit 13. The clamp 422 can be configured to retain the first and second sensors 420a, 420b in place with respect to the conduit 13. The first and second sensors 420a, 420b can be, for example, first and second diodes (e.g., photodiodes) that can be configured to emit and detect light to and from each other. In some embodiments, a single camera is used as a sensor, in lieu of a second sensor.

The first and second sensor assemblies 214, 216 can be separated by a distance D1. The distance D1 between first sensor assembly 214 and the second sensor assembly 216 can be measured parallel to the abrasive material flow path 318. In some embodiments, the conduit 13 includes one or more markings to facilitate attachment of the sensor assemblies 214, 216 to the conduit 13 such that they are separated by a known distance D1. In some embodiments, the distance D1 is determined by measuring (e.g., via a ruler, tape, or other measuring structure).

Figure 4B:
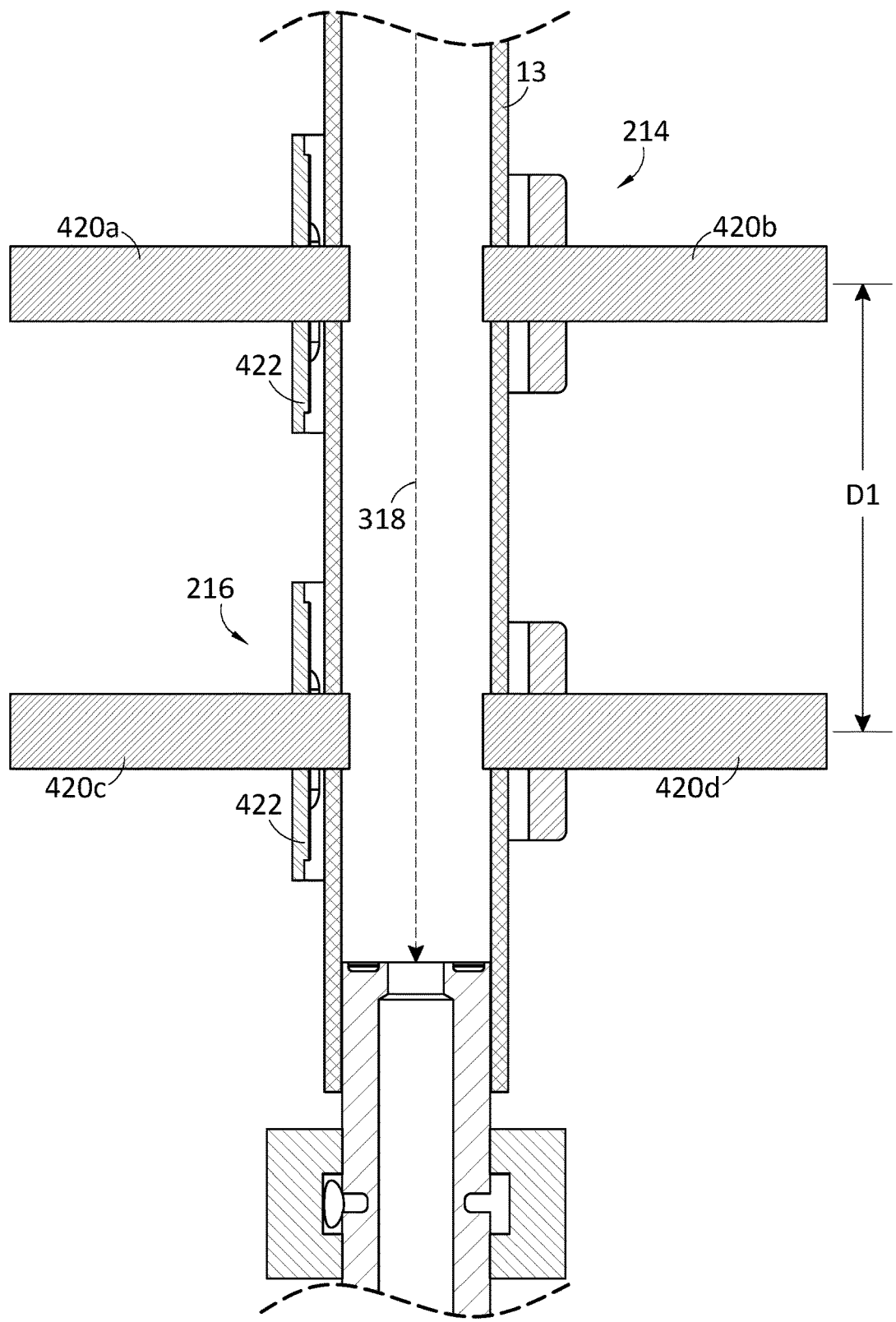
FIG. 4B is an enlarged partial cross-sectional view of a portion of the abrasive material monitoring system of FIG. 2, wherein the sensors penetrate the walls of the conduit.

As illustrated in FIG. 4B, one or more of the sensors 420a-d can penetrate the wall of the conduit 13. Penetrating sensors can be used with conduits that are opaque or otherwise do not allow sufficient light transmission to allow optical detection of abrasive material flow phenomena within the conduit 13.

Figure 5:
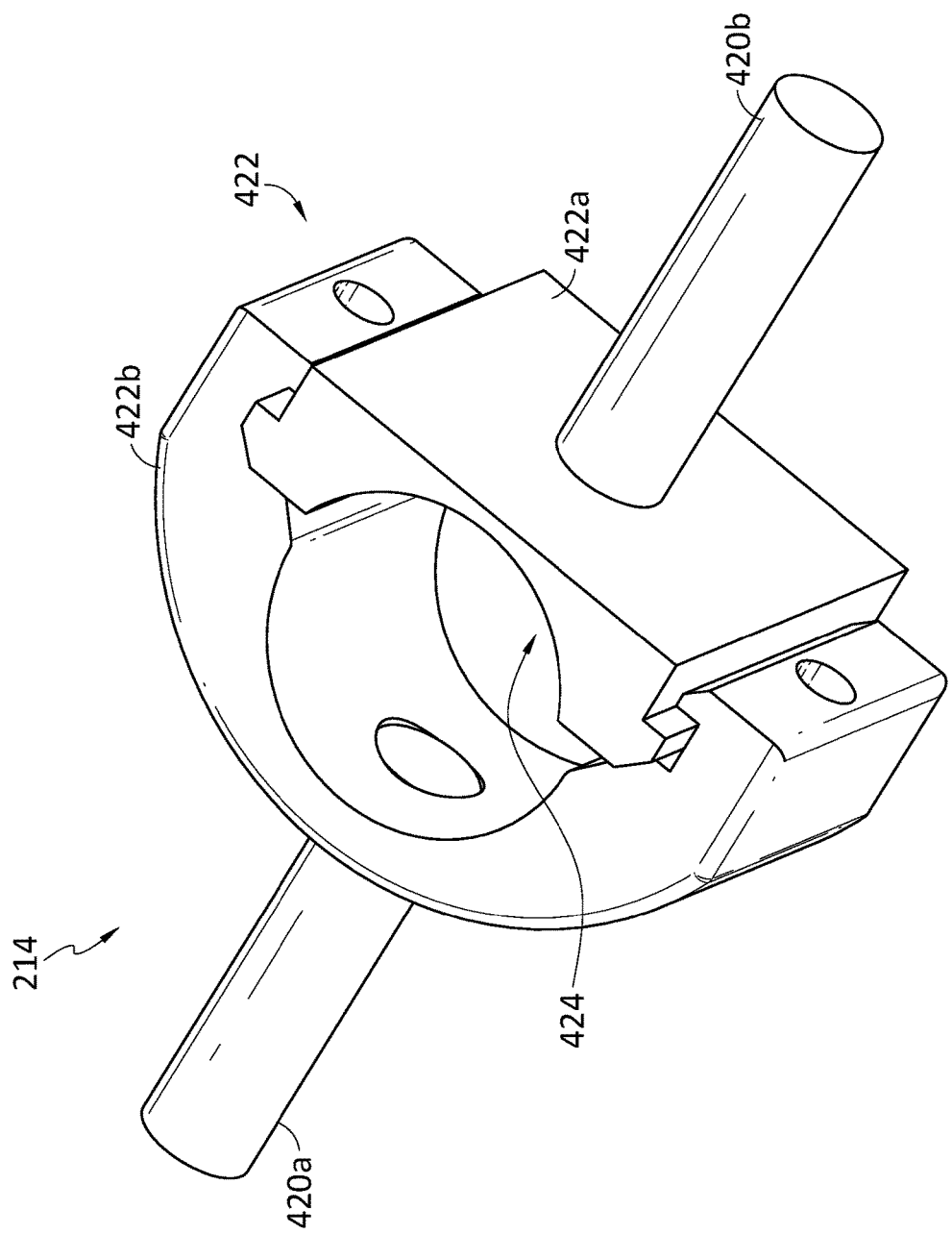
FIG. 5 is an isometric view of a sensor assembly configured in accordance with an embodiment of the present technology.
Figure 6A:
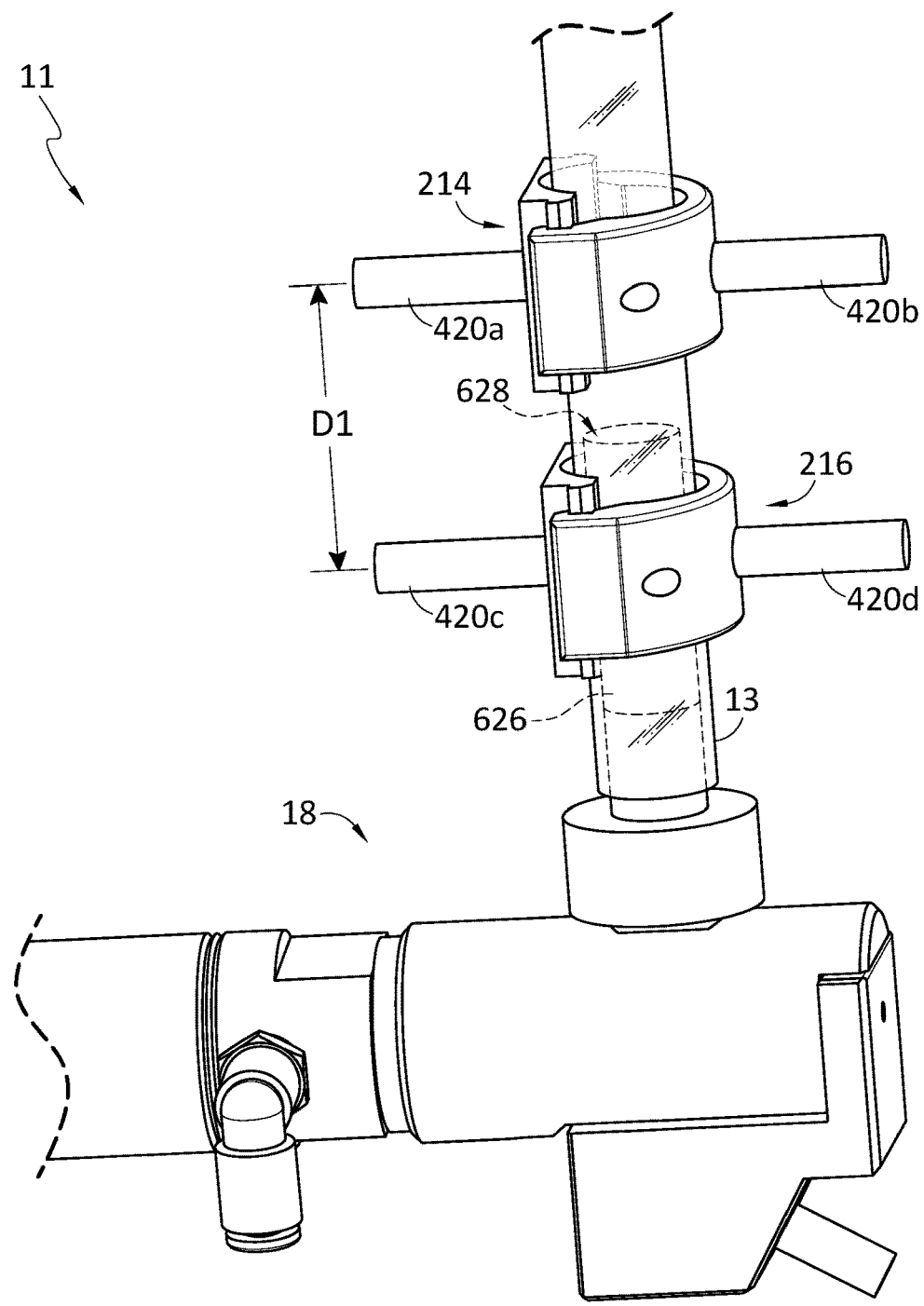
FIG. 6A is an isometric view of a column of abrasive material positioned in a portion of the abrasive material monitoring system of FIG. 2.

FIG. 5 is an isometric view of the first sensor assembly 214 disconnected from the remainder of the above-described abrasive material monitoring system 11. The clamp 422 can include a clamp cavity 424 configured to receive a portion of the abrasive material monitoring system 11 (e.g., the conduit 13). In some embodiments, the sensor assembly 214 is connected to the conduit 13 via another means, such as via an adhesive, fastener, or other means configured to secure the sensor assembly 214 to the conduit 13. The clamp 422 can include a first clamp portion 422a and a second clamp portion 422b. The first and second clamp portions 422a, 422b can be configured to connect and disconnect to and from each other to facilitate connection and disconnection to and from the conduit 13. In some embodiments, the clamp 422 is a single component (e.g., a clamshell clamp, a collar, or other single component). Use of a releasably connectable clamp 422 can allow the sensor assembly 214 to be retrofitted to a conduit of an already existing abrasive material delivery system and can allow for adjustment of the distance D1 between sensors (as shown in FIG. 6A). The second sensor assembly 216 can include some or all of the above described features of the first sensor assembly 214.

FIG. 6A is an isometric view of the abrasive material monitoring system 11 being used in accordance with an embodiment of the present disclosure. As illustrated, the abrasive material monitoring system 11 includes a conduit 13 conveying abrasive material 626 between a first valve 16 and a second valve 18 (as shown in FIG. 2). Positioned within the conduit 13 is a column of abrasive material 626 moving through the conduit 13 toward the second valve 18. The column of abrasive material 626 can move through the conduit 13 via forces generated by, for example, gravity and/or pressure (e.g., as generated by a flow conditioning device).

When no measurements are desired, the first (e.g., upstream) valve can be open, and the sensors 214, 216 can be inactive. The second valve 18 can be used to control the flow rate of abrasive material to the cutting head.

When a measurement is desired, the second valve 18 continues to actively feed abrasive material 626 to the cutting head, but the upstream shutoff valve is closed (e.g., via the controller), thereby cutting off flow of abrasive material between the hopper and the conduit 13. Accordingly, the abrasive material 626 begins to empty from the conduit 13 (e.g., drop tube) and, as illustrated in FIG. 6A, a top surface 628 of the column of abrasive material 626 is formed as the volume of abrasive material in the conduit 13 begins to decrease. As time passes and abrasive material 626 (e.g., at least portions thereof) are actively fed to the cutting head, the top surface 628 of the column moves in a downstream direction (e.g., toward the second valve 18). As the top surface 628 of the column moves downstream, the first sensor assembly 214 (e.g., the upstream sensor assembly) detects the top surface 628 of the column of abrasive material 626 at a first position or location (e.g., passing the first sensor assembly 214 or passing through a line of sight of the sensors of the first sensor assembly 214) and a timer is started. For example, the first sensor assembly 214 can detect the moment when the conduit 13 is clear of abrasive material between the two sensors 420a, 420b of the first sensor assembly 214. The timer can, for example, be associated with the controller and/or operatively coupled to the sensor assembly 214. The top surface 628 of the column of the abrasive material 626 continues to descend until it passes the second sensor assembly 216 (e.g., the downstream sensor assembly), which in turn stops the timer (e.g., via the controller) when the second sensor assembly 216 detects the top surface 628 at a second location downstream from the first location. The upstream shutoff valve can then re-open, thereby allowing abrasive material to flow from the hopper into the conduit 13, causing the conduit 13 to refill with abrasive material and supply abrasive material to the cutting head and/or allowing components of the high-pressure liquid jet cutting system to operate in a substantially uninterrupted manner.

The conduit 13 can be sized, shaped, and/or otherwise configured to permit continual supply of abrasive material to the second valve 18 while the first and/or second sensor assemblies 214, 216 are used to collect data to calculate a flow rate of the abrasive material (e.g., a flow rate of the abrasive material passing through an outlet or outlet orifice of the conduit 13 and/or passing through the second valve 18). For example, a volume of the conduit 13 between the second sensor assembly 216 (or the first sensor assembly 214 in the case of use of only one sensor assembly) and the second valve 18 can be great enough to allow abrasive material to be introduced to the conduit 13 from the first valve 16 to refill the conduit 13 before the volume between the second sensor assembly 216 and the second valve 18 empties (e.g., the first valve 16 call be configured to allow a greater flow of abrasive material than the second valve 18 during this refill process).

In some embodiments, the conduit 13 has a uniform or substantially uniform cross-section along all or a portion of the length of the conduit 13, as measured perpendicular to an abrasive material flow path through the conduit 13. In some embodiments, the conduit 13 includes a bulged region or some other increased-cross-section area between the second sensor assembly 216 and the second valve 18 to increase the volume of the conduit 13 between the second sensor assembly 216 and the second valve 18.

Figure 6B:
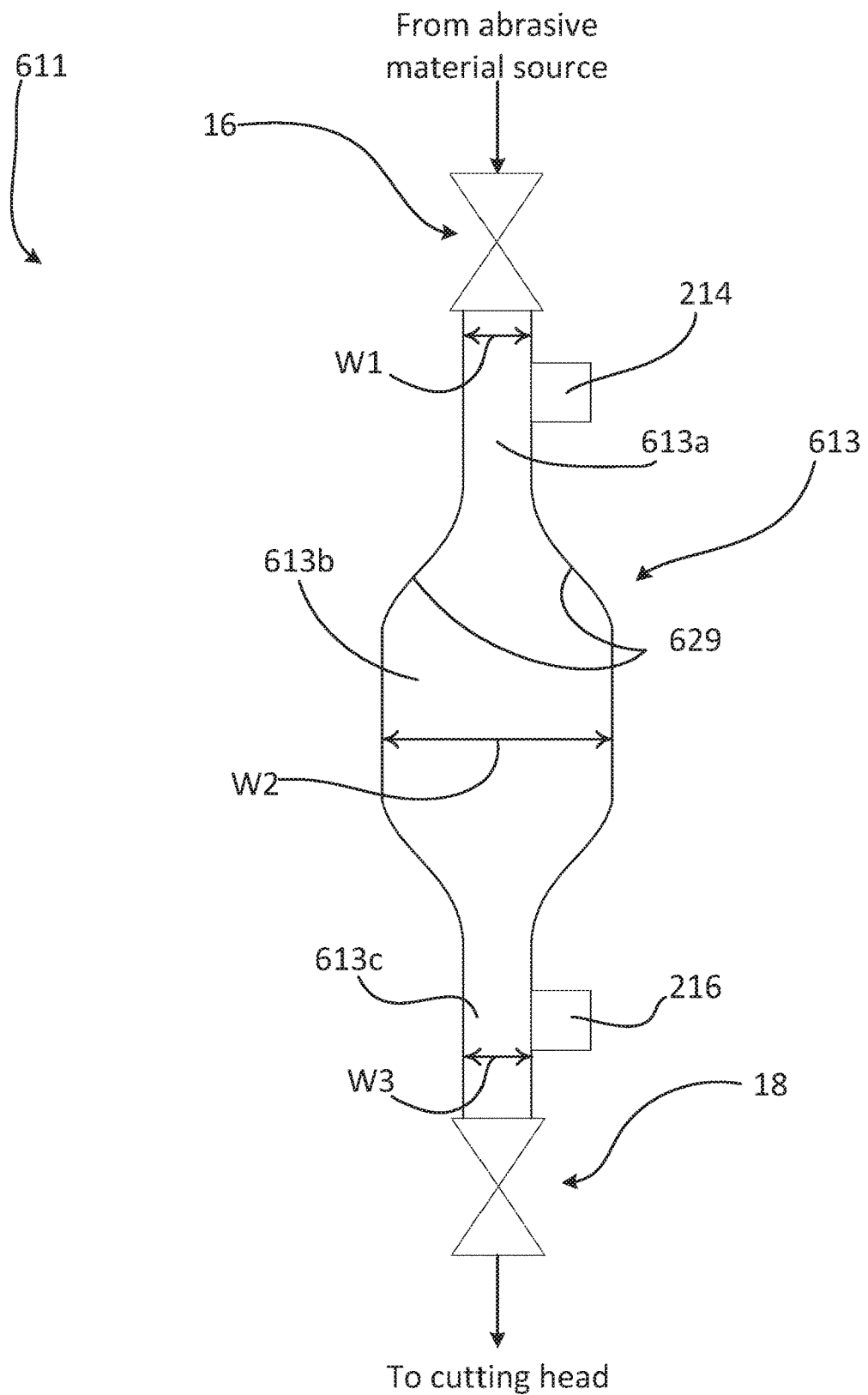
FIG. 6B is a schematic illustration of a sensing subassembly having a bulged region.

FIG. 6B illustrates a sensor subassembly 611 that can have many or all of the characteristics of the abrasive material monitoring system 11 described above. The sensor subassembly 611 can include a conduit 613 (e.g., a chamber) having a first portion 613a (e.g., an upstream portion), a second portion 613b (e.g., a bulged or intermediate portion), and a third portion 613c (e.g., a downstream portion). The second portion 613b can be positioned between the first and third portions 613a, 613c of the conduit 613 along the length of the conduit. In some embodiments, the second portion 613b of the conduit 613 has an increased cross-sectional area or bulge. The second portion can be between the first and second sensors 214, 216, which can be connected to the first portion 613a and third portion 613c of the conduit 613, respectively. The conduit 613 can include a transition portion 629 between the first portion 613a and the second portion 613b in which the width of the conduit 613 widens.

This transition portion 629 can be sized and shaped to reduce the risk of air pockets within the conduit 613. For example, a maximum expansion angle (e.g., angle of the wall of the conduit 613 as measured in a plane coincident with a central flow path of abrasive material through the conduit 613 or with longitudinal axis of the conduit 613) with respect to a longitudinal axis of the conduit 613 can be less than 20°, less than 25°, less than 30°, less than 35°, less than 40°, and/or less than 45°. Reducing or eliminating air pockets in the conduit 613 can increase the accuracy and reliability of flow rate measurements calculated for the column of abrasive material, as all, or substantially all of the volume of the conduit 613 downstream of the top of the column of abrasive material can be assumed to consist of abrasive material.

Each of the portions 613a-c can have a width W1-3 (e.g., a diameter or maximum cross-sectional width proportionate to a cross-sectional area), as measured perpendicular to a direction of flow of abrasive material through the conduit 613. The width W1 of the first portion 613a of the conduit 613 can be less than a width W2 of the second portion 613b, which can, in turn, be greater than a width W3 of the third portion 613c of the conduit 613. In some embodiments, the first and third widths W1, W3 are equal or substantially equal. The second width W2 of the second portion 613b of the conduit 613 can be at least 110%, at least 115%, at least 125%, at least 140%, at least 175%, at least 200%, at least 250%, at least 300%, and/or at least 500% of width W1 of the first portion 613a of the conduit 613. In some embodiments, the second width W2 is at least ten times the width W1 of the first portion 613a of the conduit 613.

In some embodiments, the sensor subassembly 611 only includes a single sensor positioned downstream of the intermediate portion 613b of the conduit 613. In such embodiments, time between shutting off the valve 16 and detection of a top of a column of abrasive material by the sensor can be used to calculate flow rate of abrasive material through the conduit 613.

The increased width W2 of the second portion 613b of the conduit 613 can reduce local velocity of the top of a column of abrasive material moving through the conduit 613, for a given flow rate of abrasive material through the second valve 18. As described above, the first sensor 214 can be used to detect when the top of the column of abrasive material passes a first location in the conduit 613. In the embodiment of FIG. 6B, this first location can be upstream of the bulged portion 613b of the conduit 613. The second sensor 216 can detect the top of the column of abrasive material at a second location (e.g., downstream of the bulged portion 613b). In some embodiments, the processor or other device used to calculate flow rate of the abrasive material can generate a non-dimensional proxy value for the velocity of abrasive material through the conduit 613. The proxy values of abrasive material velocity through the conduit 613 can be associated with cutting modes of the cutting head of the liquid jet cutting system such that the proxy values can be used to make the same diagnostic determinations described above and below with respect to actual velocity measurements obtained in straight/uniform cross-section conduits 613. The proxy values are proportional to velocity and can be used to indicate proportional changes in flow characteristics in a manner similar to the same as those indicated by monitoring absolute velocity.

Using a bulged conduit 613 can allow for a greater volume (e.g., a larger measurement volume) of abrasive flow between the sensors 214, 216 without requiring an increased conduit length between the sensors 214, 216. Increasing the measurement volume between the sensors can, in some embodiments, increase the accuracy of the flow rate measurements of the sensors 214, 216. For example, increasing the measurement volume between the sensors 214, 216 can reduce the potential impact of localized flow anomalies which may occur during testing, as such potential anomalies would comprise a smaller portion of the measured flow.

In another embodiment, illustrated in FIG. 7, a distance D2 between the first valve 16 and the first sensor 214 is known and additional sensors may or may not be present. The distance D2 between the first valve 16 and the first sensor 214 can be measured parallel to the length of the conduit 13 and/or parallel to the abrasive material flow path within the conduit 13. When an abrasive material flow rate measurement is desired, the first valve 16 is closed and the timer started. When the top of the column of abrasive material 626 passes the sensor 214, the timer is stopped. The first valve 16 can now open and the conduit refill with abrasive material. The devices, systems, and methods of the present disclosure thus enable measuring flow rate of abrasive material without interrupting the flow of abrasive material to the second valve 18. Preferably, the abrasive material flow rate measurements can be taken without interrupting operation of the liquid jet cutting head. Moreover, the devices, systems, and methods of the present disclosure enable flow measurements to be taken without disconnecting an abrasive supply (e.g., a hopper) from the conduit 13. In some embodiments, enabling flow rate measurements without removal of the hopper can reduce costs associated with such measurements. For example, the hopper or other abrasive material supply device can operate at vacuum pressure, which can be maintained during measurements according to the present inventions.

The time measurement taken can be used to calculate several characteristics of the abrasive material flow, including the mass flow rate of the abrasive material. For example, once the time interval has been measured, a calculation based at least in part on the time interval and the separation distance D1 of the sensor assemblies 214, 216 (FIG. 6A) or the distance D2 between the first valve 16 and the single sensor 214 (FIG. 7) can be used to determine the average velocity of the abrasive material column (e.g., by dividing the distance between the sensors by the measured time). Based at least in part on the velocity of the abrasive material 626 and the cross-sectional area of the conduit 13, an average volumetric flow rate can be calculated. Based at least in part on the calculated volumetric flow rate and a known density of the abrasive, the mass flow rate can be determined. In some embodiments, some or all of the above calculations and/or control of the components (e.g., valves) of the abrasive material monitoring system 11 can be automatically performed via one or more processors of a controller (e.g., the controller 20 described above with respect to FIG. 1). For example, the controller can include a memory device carrying programmed instructions adapted to cause the processor to perform the above-described operations to control the valves 16, 18, send and receive signals to and from the sensor assemblies 214, 216, and/or perform calculations based on the signals received from the sensor assemblies 214, 216. In some embodiments, the controller can be coupled to a screen or other user interface configured to display the measured and/or calculated properties.

In some embodiments, three or more sensor assemblies can be positioned on or in the conduit 13 to measure position of the column of abrasive material 626 as it flows through the conduit 13. In some such embodiments, two or more velocities can be measured (e.g., velocities between pairs of sensor assemblies along the length of the conduit 13) and plotted against one or more of time and position along the conduit 13. A function can be fit to the plot of abrasive velocities to characterize abrasive flow rate behavior through the conduit 13. In some embodiments, the measured velocities are used confirm accuracy of the overall flow rate of abrasive material through the conduit 13. In some embodiments, more than five sensors, more than eight sensors, and/or more than ten sensors can be positioned on or in the conduit 13 to measure position of the column of abrasive material 626 as it flows through the conduit 13.

Figure 8C:
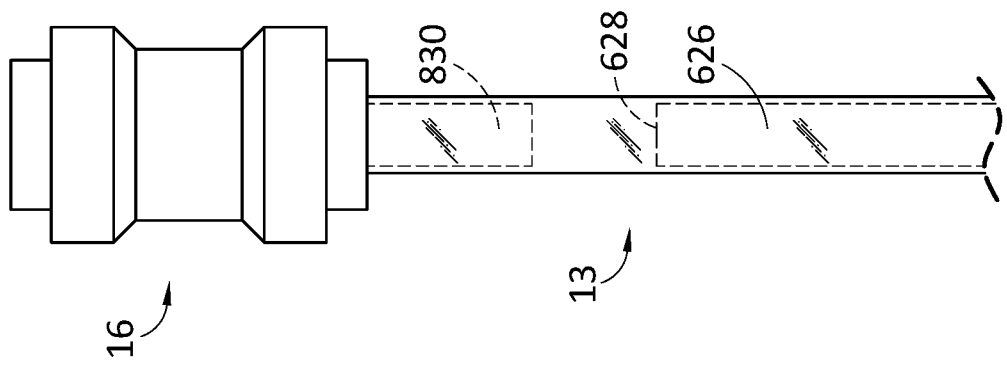
FIG. 8C is a side view of a column of abrasive material positioned in the abrasive delivery conduit of FIG. 8B after the column of abrasive material has been conditioned by the flow conditioner.
Figure 8B:
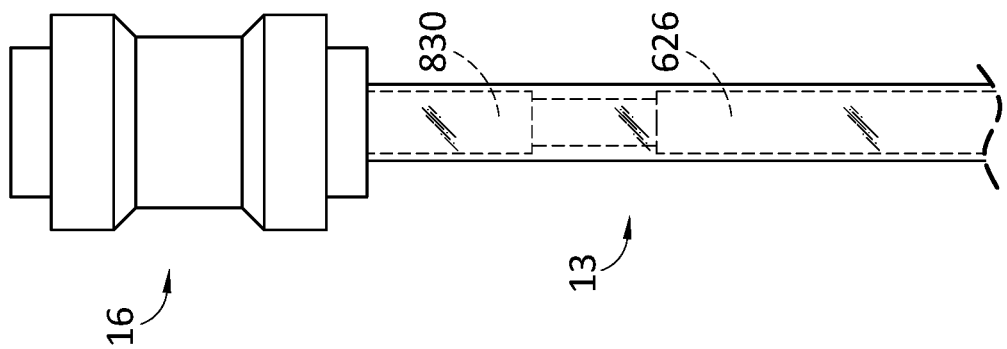
FIG. 8B is a side view of a column of abrasive material positioned in an abrasive delivery conduit including a flow conditioner configured in accordance with an embodiment of the present technology.
Figure 8A:
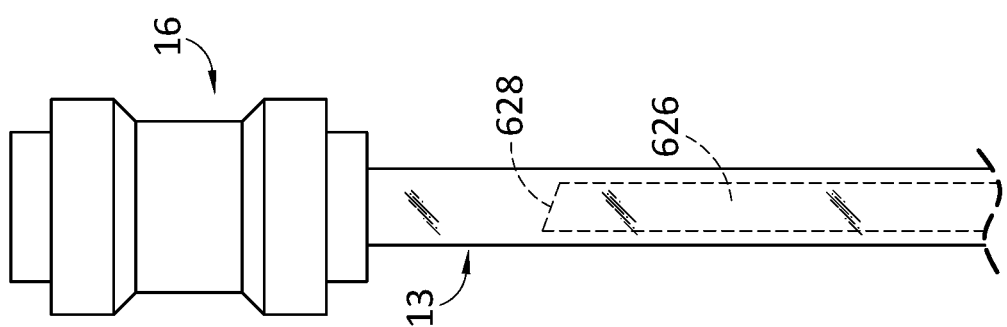
FIG. 8A is a side view of a column of abrasive material positioned in an abrasive delivery conduit.

As previously described, the abrasive material delivery system can include a flow conditioner positioned between the upstream valve and the upstream sensor to improve the accuracy of the calculations. For example, as illustrated in FIG. 8A, the top surface 628 of the column of abrasive material 626 following closure of the first valve 16 may not be flat. Thus, the measurements taken by the sensors may not be precise. To reduce the likelihood of non-flat abrasive columns, a flow conditioner 830 can be utilized (see, e.g., FIG. 8B). The flow conditioner 830 can be, for example, a reduced-inner diameter portion of the conduit 13 (e.g., a step). In some embodiments, the flow conditioner 830 is a pinch valve. The flow conditioner 830 can be configured to flatten or otherwise condition flow of abrasive material 626 therethrough such that the top surface 628 of the column of abrasive material 626 is flat or substantially flat (see, e.g., FIG. 8C).

Figure 9:
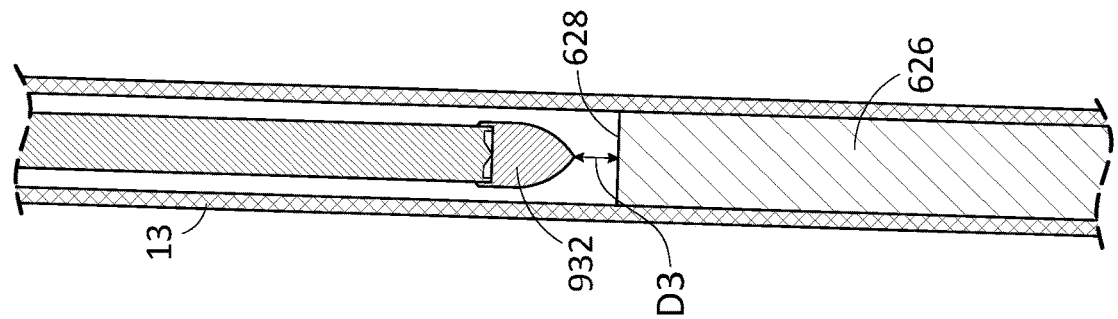
FIG. 9 is a cross-sectional side view of an abrasive delivery conduit and sensor arrangement in which the sensor is positioned within the conduit in accordance with another embodiment of the present technology.

In some embodiments, as illustrated in FIG. 9, a sensor 932 can be positioned at least partially within the conduit 13. The sensor 932 can be, for example, a photo diode array, an ultrasonic sensor, a capacitive sensor, and/or some other sensor having a similar function. The sensor 932 can be configured to measure a distance D3 between the sensor 932 and the top surface 628 of a column of abrasive material 626 within the conduit 13. In some embodiments, the sensor 932 is aligned parallel to the conduit 13 (e.g., parallel to the movement path of the column of abrasive material 626). The sensor 932 can be positioned such that space remains between the sensor 932 and the walls of the conduit 13 to allow abrasive material to flow around the sensor 932. In some embodiments, the sensor 932 can function as a flow conditioner to reduce concavity, convexity, and/or tilt of the top surface 628 of the column of abrasive material 626. The sensor 932 can be configured to measure the distance D3 between the sensor 932 and the top surface 628 of the column of abrasive material 626 at two or more points in time (and, therefore, at two or more points along the length of the conduit 13). These measurements can be communicated to a controller to determine velocity of the column of abrasive material 626 through the conduit 13.

Figure 10:
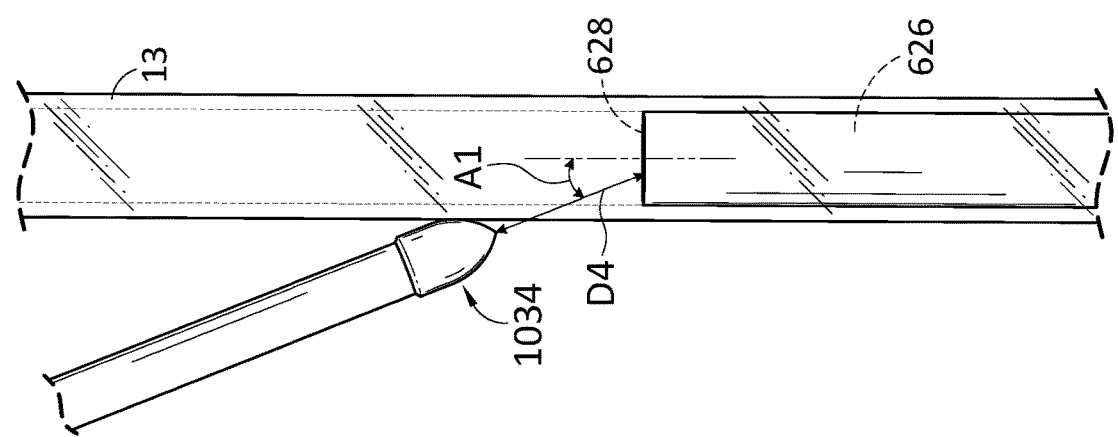
FIG. 10 is a cross-sectional side view of an abrasive delivery conduit and sensor arrangement in which the sensor is positioned outside the conduit in accordance with another embodiment of the present technology.

As illustrated in FIG. 10, a sensor 1034 can be positioned at least partially outside of the conduit 13. In some such embodiments, the sensor 1034 can be oriented at an angle A1 with respect the length of the conduit 13. The angle A1 can between, for example, 0°-90°. In some embodiments, the angle A1 is between 20°-70°, between 10°-45°, between 30°-60°, and/or at some other oblique angle. The sensor 1034 can, like the sensor 932 of FIG. 9, be configured to measure a distance D4 between the sensor 1034 and the top surface 628 of the column of abrasive material 626 at one or more points in time. In some embodiments, measurement signals and associated times can be communicated to a controller to calculate the velocity of the column of abrasive material 626 through the conduit 13. In some embodiments, the sensor 1034 extends through a portion of the sidewall of the conduit 13 in a manner similar to that illustrated in FIG. 4B.

Figure 11:
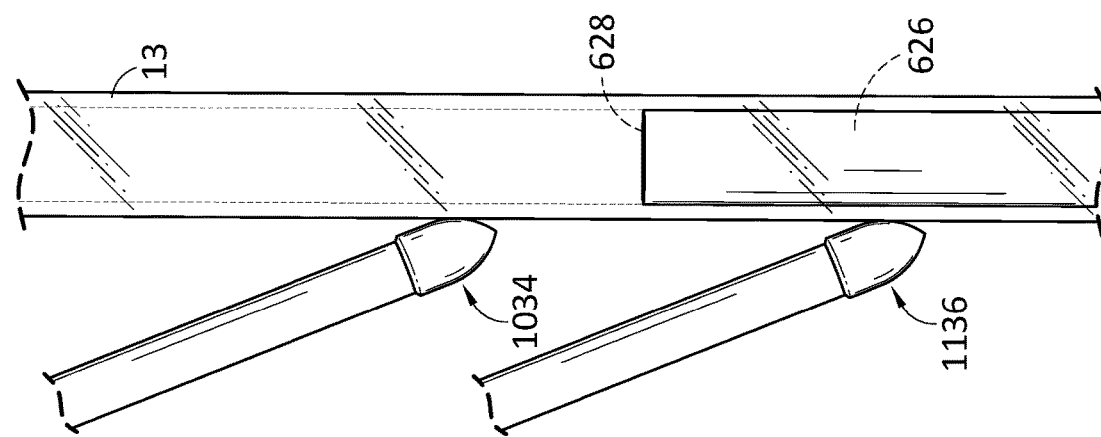
FIG. 11 is a cross-sectional side view of an abrasive delivery conduit and sensor arrangement having two sensors positioned outside the conduit in accordance with another embodiment of the present technology.

In some embodiments, as illustrated in FIG. 11, a second sensor 1136 can be used to sense a position of the top surface 628 of the column of abrasive material 626 within the conduit 13. The second sensor 1136 can be positioned at an angle similar to or the same as the angle A1 at which the first sensor 1034 is oriented. The second sensor 1136 can be positioned downstream or upstream of the first sensor 1034. In some embodiments, the second sensor 1136 is redundant with the first sensor 1034 and is used to validate measurements taken by the first sensor 1034. In some embodiments, distance measurements from both the first and second sensors 1034, 1136 are used to calculate flow rate of the column of abrasive material 626 through the conduit 13. In some embodiments, the second sensor 1136 is positioned outside of the conduit 13 and/or at an angle with respect to the conduit. In some embodiments, the second sensor 1136 is positioned at least partially within the conduit 13 (e.g., in a same or similar position as the sensor 932 described above with respect to FIG. 9).

Figure 12:
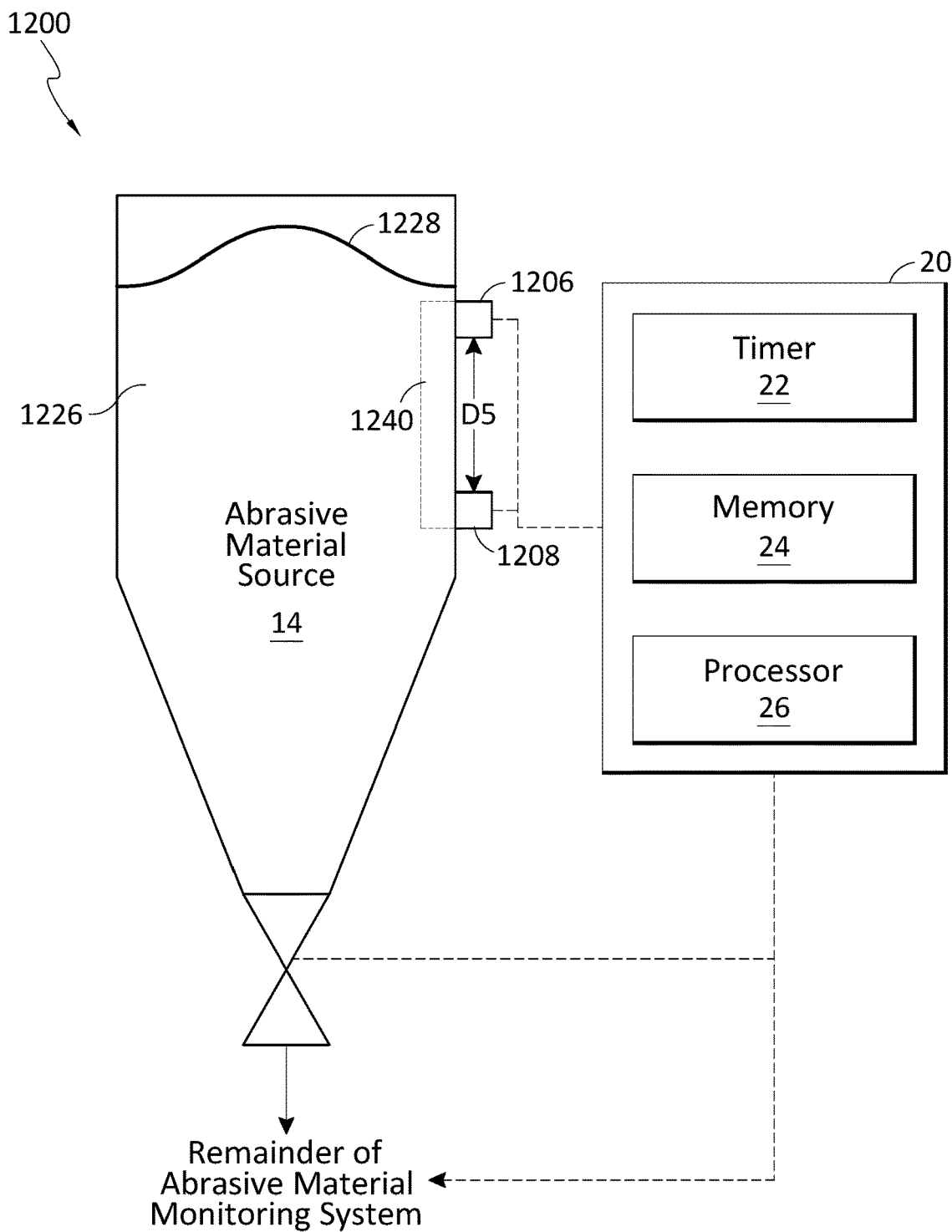
FIG. 12 is a schematic illustration of an abrasive material source monitoring system for measuring and managing flow of abrasive material in an abrasive material source in accordance with some embodiments of the present technology.

As discussed above with respect to FIG. 1, an abrasive source monitoring system may be used to monitor flow characteristics of abrasive material within an abrasive material source (e.g. a hopper). FIG. 12 illustrates an embodiment of an abrasive material source monitoring system 1200 configured in accordance with embodiments of the present technology. The abrasive material source monitoring system 1200 can include a first sensor 1206 and a second sensor 1208, each configured to detect a top surface 1228 of abrasive material 1226 within an abrasive material source 14 (e.g. a hopper). The sensors 1206, 1208 can be structurally and/or functionally similar to or the same as the above described sensors 214, 216 of the abrasive material monitoring system 11.

One challenge associated with measuring flow characteristics and/or supply levels of abrasive material within the abrasive material source 14 is that the top surface 1228 of the abrasive material 1226 can have an angle of repose. The angle of repose, i.e. mounding of abrasive material at or near a centerline of the abrasive material source 14 can introduce unpredictable and/or unreliable measured flow characteristics of the abrasive material 1226. In some embodiments, one or more smaller tubes 1240 can be positioned within the abrasive material source 14. The smaller tubes 1240 can be open on both ends to allow continual flow of abrasive material 1226 through the smaller tubes 1240. For example, the smaller tubes 1240 may be positioned near a wall of the abrasive material source 14 and adjacent the sensors 1206, 1208. In some such embodiments, the sensors 1206, 1208 can be configured to detect flow characteristics of the column of abrasive material 1226 within the smaller tube 1240, thereby reducing or eliminating distortions caused by an angle repose on the top surface 1228 of the abrasive material 1226. In some embodiments, measurements from a number of the smaller tubes 1240 can be compared, combined, and/or averaged to determine the feed rate of abrasive material 1226 through the abrasive material supply system.

In some embodiments, the sensors 116, 118 are configured to send and receive signals to and from a controller 20. The controller 20 can include one or more timers 22, one or more memory devices 24, and/or one or more processors 26. The controller 20 can be configured to operate in a manner similar to or the same as a controller 20 described above as well as the other controllers and subcomponents described with respect to FIGS. 2-16. For example, the controller 20 can be configured to operate the first valve 16 at the downstream end of the abrasive material source 14.

Figure 13:
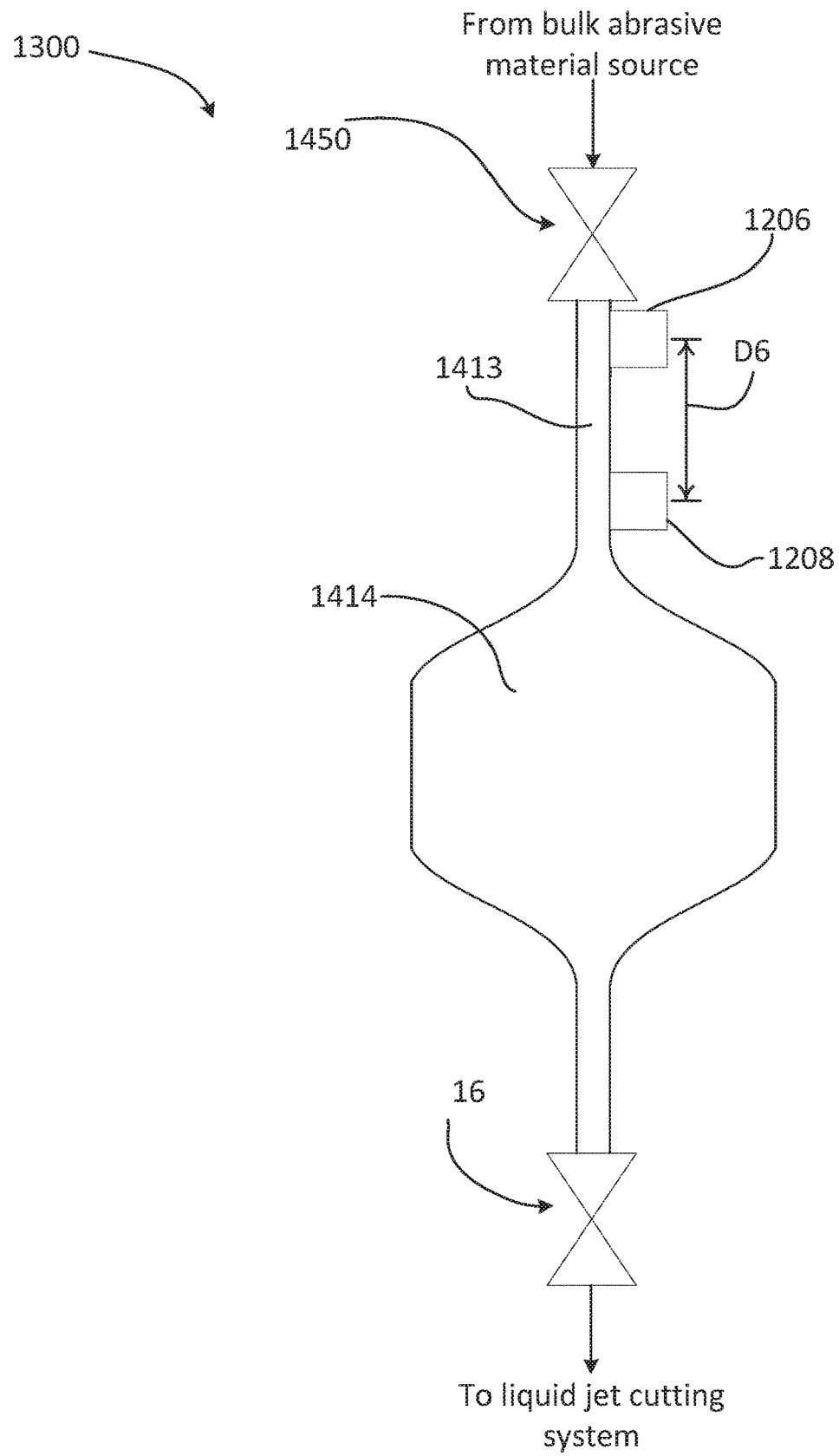
FIG. 13 is a schematic illustration of another abrasive material source monitoring system positioned upstream of a local abrasive source storage device.

FIG. 13 illustrates another embodiment of an abrasive material source monitoring system 1300. The abrasive material source monitoring system 1300 can include two sensors 1206, 1208 that are separated by a distance D6 and that can operate in a manner similar to or the same as the sensors of the abrasive material source monitoring system 1200 described above. The sensors 1206, 1208 can be connected to an upstream conduit 1413 upstream of a local abrasive material source (e.g., a hopper). The abrasive material source monitoring system 1300 can be used to monitor flow characteristics of abrasive material upstream of and entering the local abrasive material source. The sensors 1206, 1208 can interact with a controller similar to or the same as the controller 20 described above, and in a manner similar to or the same as that of the sensors 1206, 1208 of the abrasive material source monitoring system 1200. The abrasive material source monitoring system 1300 can be configured to detect when supply of abrasive material from a bulk abrasive material source ceases. For example, the system 1300 can include an inlet valve 1450 configured to open and close to permit and stop flow of abrasive material from a bulk abrasive material source to the local abrasive material source 1414. If the inlet valve 1450 is open, and one or both of the sensors 1206, 1208 detect a top of an abrasive material column, the system 1300 can be configured to alert a user or otherwise indicate that abrasive material is no longer being supplied to the local abrasive material source 1414. A measured time between the top of the column of abrasive material passing the respective sensors 1206, 1208 can be used to calculate the flow rate of abrasive material into the local abrasive material source 1414. This calculated flow rate can be used to estimate the amount of time remaining before the local abrasive source 1414 will run out of abrasive material.

Figure 14:
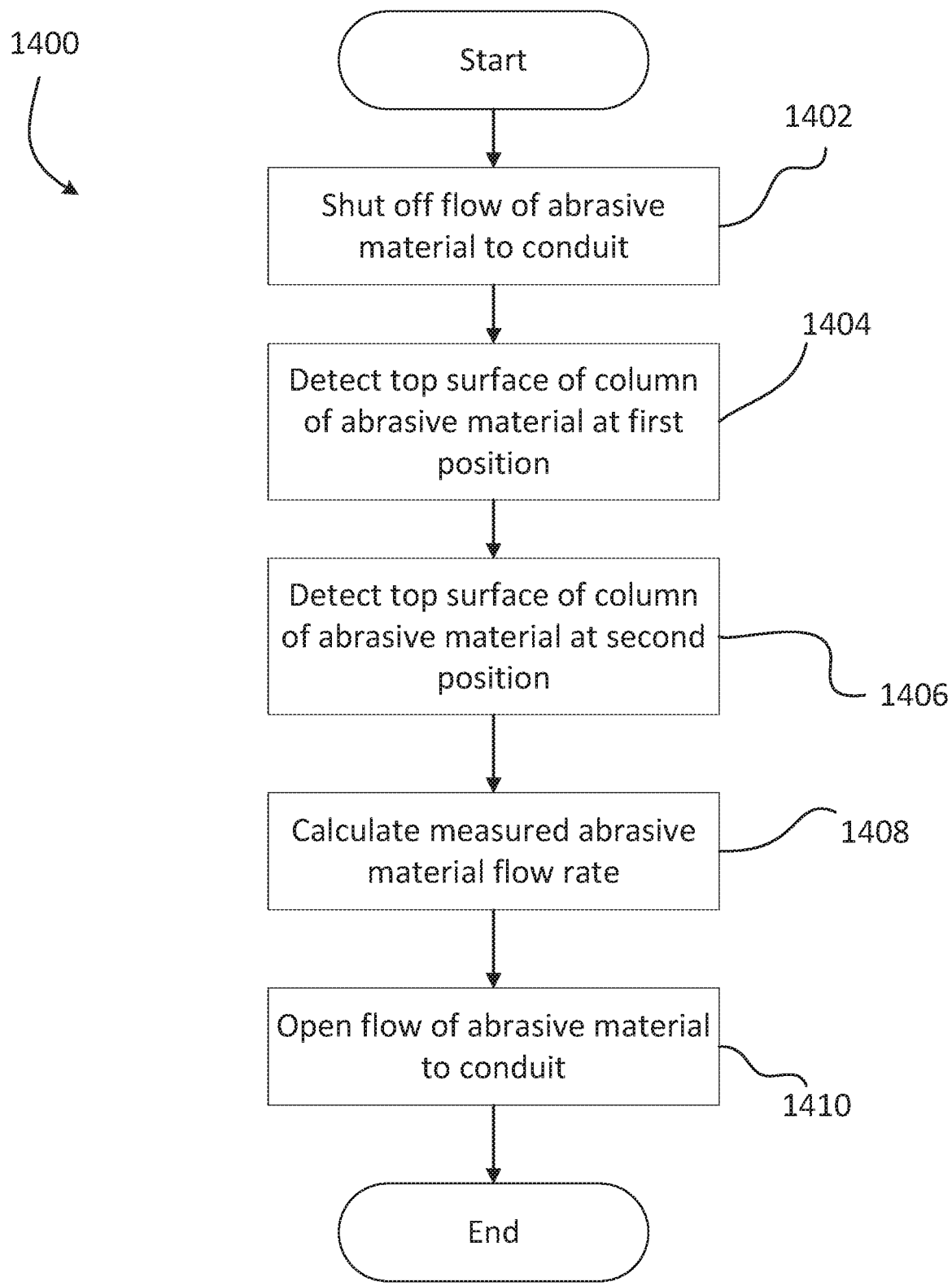
FIG. 14 is a flow diagram illustrating an example process for determining a flow rate of abrasive material through a conduit in accordance with some embodiments of the present technology.

FIG. 14 is a flow diagram of a routine 1400 for measuring flow of an abrasive material in a conduit using the above-described systems in accordance with embodiments of the present technology. In some embodiments, all or portions of the routine 1400 can be performed by the above described controllers and/or processors (e.g., in accordance with executable instructions carried by the above described memory devices). The routine can begin with, for example, opening the first valve 16 and/or opening the second valve 18, to initiate flow of abrasive material 626 through the conduit 13.

In block 1402, flow of abrasive material to the conduit 13 is shut off or substantially shut off. For example, the first valve 16 can be closed or substantially closed to cut off the flow of abrasive between the abrasive material source (e.g., a hopper) and the conduit 13. Shutting off the flow of abrasive material can create a column of abrasive material 626 within the conduit 13 having a top surface 628. In block 1404, the top surface 628 of the column of abrasive material 626 is detected at a first position within the conduit 13. A timer can be initiated when the top surface 628 is detected at the first position. Moving to block 1406, the top surface 628 is detected at a second position within the conduit 13, downstream of the first position. The second detection can be performed by the same sensor(s) to perform the first detection in block 1404, or by a second sensor or sensor assembly. The timer can be stopped when the top surface 628 is detected at the second position and the resulting time interval between the first detection and the second detection can be used to calculate a velocity of the column of abrasive material moving through the conduit 13. Volumetric and/or mass flow rates can be calculated based at least in part on the velocity as described above (block 1408). In block 1410, the first valve 16 can be reopened to reinitiate flow of abrasive material into the conduit 13. This reopening can occur, for example, at the same time the top surface 628 of the column of abrasive material 626 is detected at the second position. Each of the steps of the routine 1400 can be performed during continuous operation of the cutting head of the liquid jet cutting system downstream of the valves 16, 18 without requiring shut off of flow to the cutting head or disconnection of the abrasive material source from the conduit 13 or first valve 16. Accordingly, dynamic flow characteristics of the abrasive material can be monitored without the need to pause or otherwise disrupt overall operation of the liquid jet cutting system.

Altogether, in some embodiments the routine 1400 can be performed in less than=one minute. In some embodiments and systems routine 1400 is performed in less than 30 seconds and/or in more than one minute. Accordingly, the abrasive material monitoring systems described herein can facilitate fast (e.g., near real-time) and accurate calibration of abrasive flow in a liquid jet cutting system without requiring shutoff of the cutting head. The abrasive material monitoring systems and associated methods described herein can be used to fine-tune the cutting process to increase performance (e.g., cut quality), increase efficiency (e.g., use less abrasive material for a given cut quality), and/or optimize flow characteristics for a given project. These efficiencies can reduce the labor required to calibrate/optimize the liquid jet cutting systems.

The routine 1400 can be performed at fixed, random, or on-demand times. For example, the abrasive material monitoring system 11 can be configured to measure one or more flow characteristics of the abrasive material at fixed intervals, at random intervals, or only in response to specific user requests. In the interval examples, the first valve 16 can fluctuate between the opened and closed configurations to initiate the measuring routines. This fluctuating can be regular (e.g., every X minutes or Y hours) or randomized.

Figure 15:
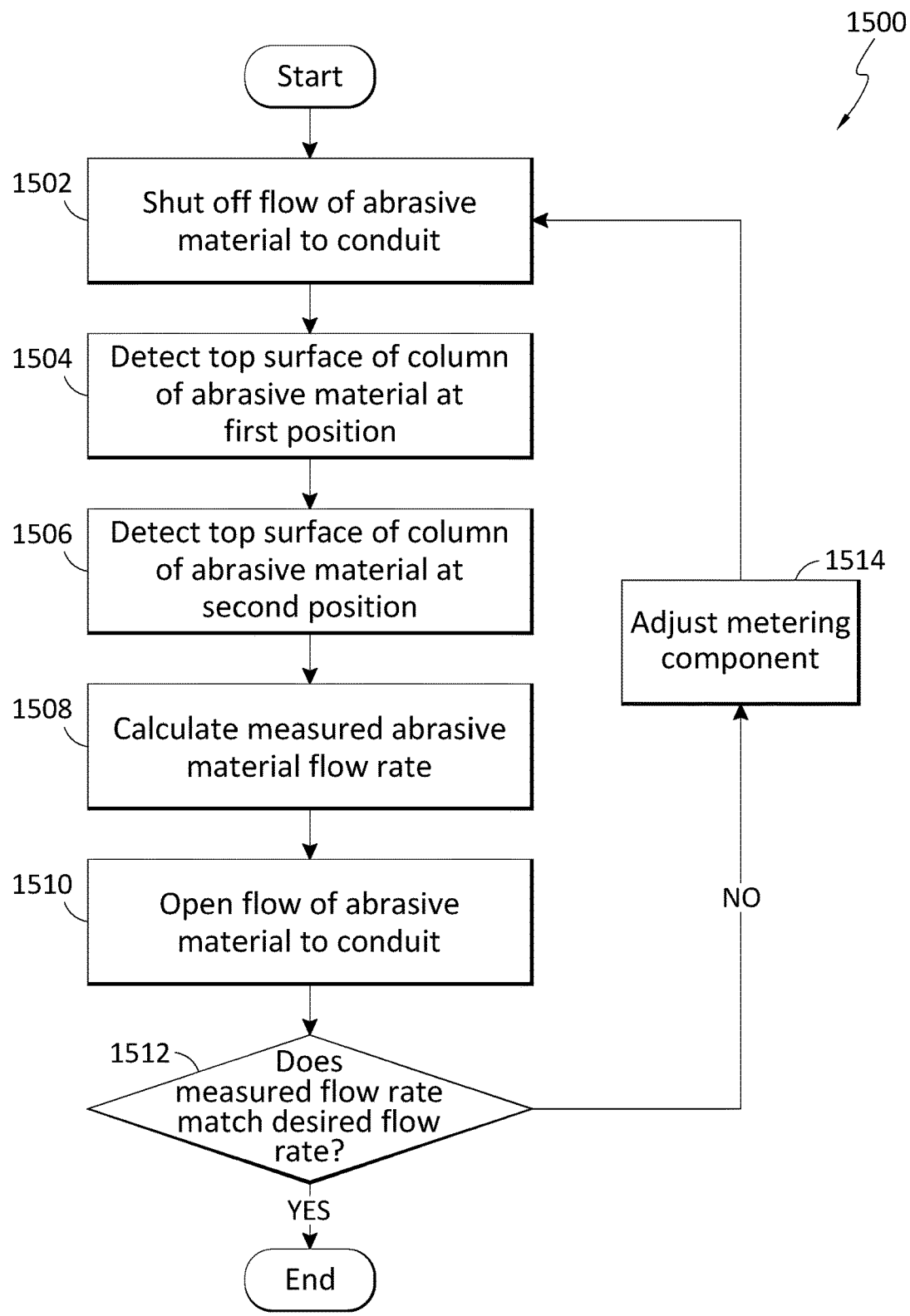
FIG. 15 is a flow diagram illustrating an example process for determining a flow rate of abrasive material through a conduit and adjusting a metering component in accordance with some embodiments of the present technology.

FIG. 15 is a flow diagram of a routine 1500 for measuring flow of an abrasive material and utilizing closed-loop operation of an abrasive material monitoring system in accordance with embodiments of the present technology. Blocks 1502-1510 of the routine 1500 can be similar to or the same as 1402-1410, respectively, described above for the routine 1400. Turning to block 1512 the measured abrasive material flow rates or other flow characteristics obtained in blocks 1502-1510 can be compared to expected values for those flow characteristics. For example, in a given cutting operation, a specified abrasive material flow rate may be used to ensure desired cut quality or other performance requirements. In a variable feed system, the second valve 18 (e.g., the metering component) can be set or otherwise configured to deliver abrasive material to downstream components (e.g., the cutting head) at the specified abrasive material flow rate. A mismatch of the measured flow rates obtained in block 1508 to the expected flow rates based on the setting of the second valve 18 can indicate incorrect calibration of the system, wear or damage to one or more components of the system (e.g., damage to the second valve 18 or other downstream component), blockage in one or more abrasive material paths, or some other problem in the system that needs to be addressed via maintenance or replacement of one or more components. In some instances, mismatch of the measured flow rates to the expected flow rates can be corrected via adjustment to one or more components of the system. For example, a lower-than-expected flow rate of abrasive material to the cutting head can be alleviated by opening the second valve to permit a higher flow rate of abrasive material to the cutting head. This adjustment can be performed in a closed-loop fashion without requiring shut off or other interruption to the operation of the cutting head. This closed-loop adjustment of one or more components in the system can be repeated to calibrate the system until the measured flow characteristics match the desired characteristics.

Figure 16:
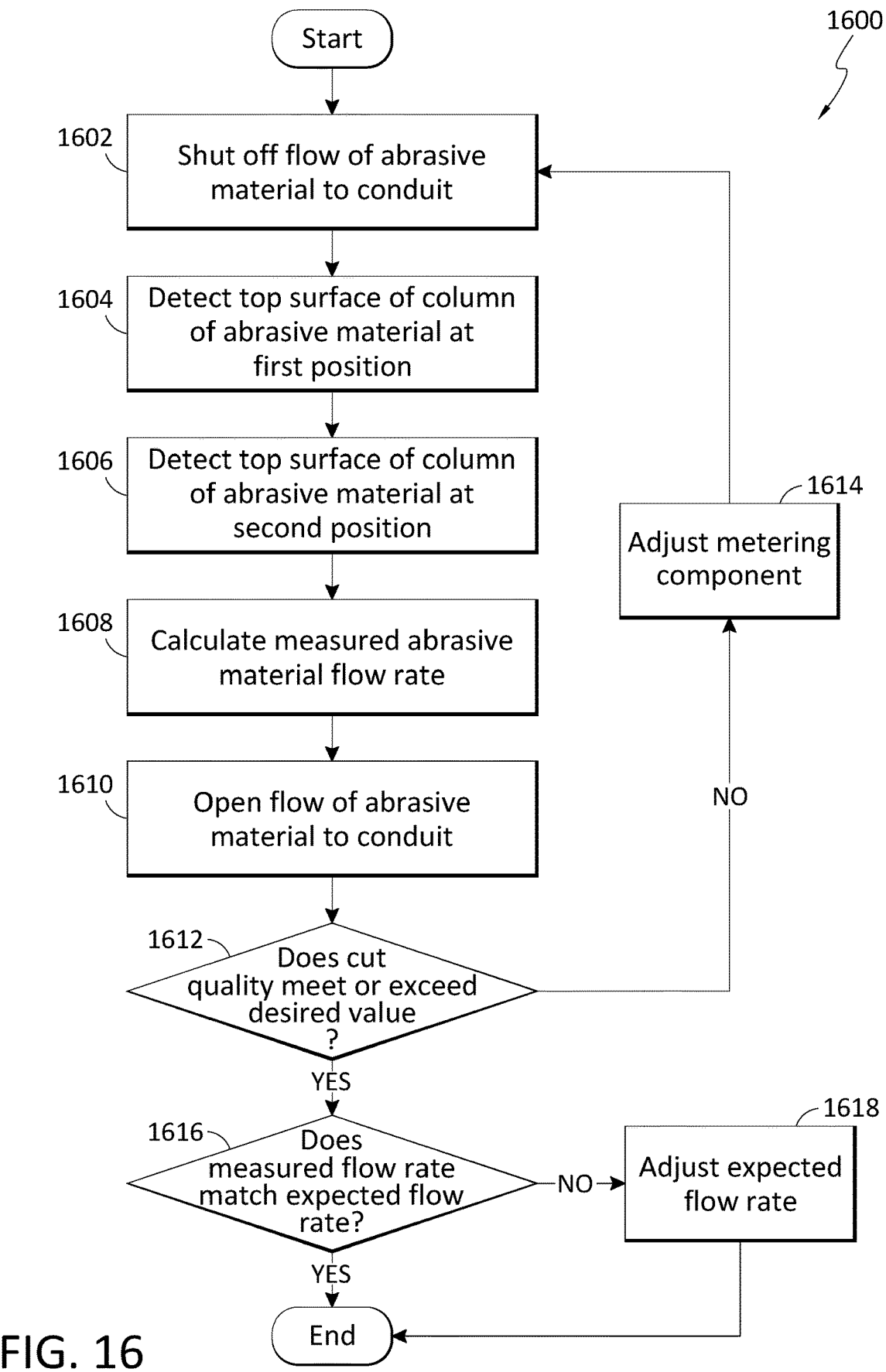
FIG. 16 is a flow diagram illustrating an example process for determining a flow rate of abrasive material through a conduit and adjusting an expected flow rate for a given cut quality in accordance with some embodiments of the present technology.

FIG. 16 is a flow diagram of yet another routine 1600 for measuring flow of an abrasive material and utilizing closed-loop operation of an abrasive material monitoring system in accordance with embodiments of the present technology. Blocks 1602-1610 of the routine 1600 can be similar to or the same as 1402-1410, respectively, described above for the routine 1400. Turning to block 1612, the cut quality exhibited by the liquid jet cutting head can be evaluated for consistency with expected values. For example, in some instances it may be desirable that a cut on a piece penetrate to a particular depth. The actual depth cut into the piece can be measured and compared with the desired depth. If the measured depth does not match the desired depth routine can proceed to block 1614 to adjust the second valve 18 (e.g., the metering component) to modify the performance of the cutting head. In other instances, a general quality of the cut can be observed. For example, any undesired notching, chipping, flaking, or other adverse cutting artifacts can be observed. In instances where such adverse artifacts are found, the second valve 18 can be adjusted to compensate.

In instances where the desired cut quality does meet expectations, the routine proceeds to block 1616 wherein the flow rate calculated/measured in block 1608 is compared to an expected flow rate for the given project. If the measured flow rate matches or substantially matches the expected flow rate the routine can end. If, however, the measured flow rate does not match the expected flow rate, the expected flow rate can be modified and updated. For example, observation of the cut quality may indicate that a lower abrasive flow rate is acceptable for a given desired cut characteristic or quality. In such an instance, adjusting the expected flow rate of the abrasive material to a lower flow rate can save costs associated with the project, thereby improving the efficiency of the system. Cost savings can be especially acute if the amount of abrasive material can be reduced, as the costs of abrasive material is often significantly higher than the other consumables in liquid jet cutting systems (e.g., lubricants, cutting fluid, etc.).

As can be appreciated by one of skill in the art, a number of variations can be made to the abrasive material delivery systems described herein. Such variations are included within the scope of the present disclosure. For example, in some embodiments, more than two sensors and/or sensor assemblies can be positioned along the conduit. By placing more sensors along the conduit, more accurate measurements of flow rates can be calculated.

Furthermore, the present disclosure provides abrasive material delivery systems capable of manually or automatically measuring abrasive flow properties, or some combination thereof. In manual measurements, for example, a measurement can be taken via activation of a "Test Nozzle" setting in a controller (e.g., a controller as disclosed and described in U.S. Pat. No. 10,146,209, attached hereto as Appendix A and incorporated herein by reference in its entirety). Moreover, in some embodiments, a user can select when to initiate a measurement by selecting an option on the controller to initiate a measurement. And in some embodiments, the user and/or controller can periodically initiate a measurement to check the flow characteristics.

The abrasive material delivery system can also be capable of automatically measuring the flow rate of the abrasive. For example, the controller can pre-determine the amount of abrasive to be used and/or the duration for a forthcoming cut and decide if the abrasive amount is sufficient to take a measurement. For example, the controller can automatically determine whether the volume of abrasive to be delivered during the duration of the cut exceeds a volume of the conduit between the upstream shutoff valve and the lower sensor's trip point. If so, a measurement can be taken. As described herein, the measurement process can include closing the upstream shutoff valve, waiting for the upper sensor to detect the top of the abrasive column, starting a timer, waiting for the lower sensor to detect the top of the abrasive column, and stopping the timer.

The present disclosure provides systems and methods for real time dynamic abrasive flow rate measurements. In addition to those advantages recognized above, the devices, systems, and methods of the present disclosure can provide the advantage of reducing the need for the customer to calibrate the abrasive material supply metering system. The devices, systems, and methods of the present disclosure can also automatically provide actual flow rate data to the cutting parameter variable in the controller and/or provide closed loop control to a variable abrasive feeding device regardless of type. Thus, the devices, systems, and methods of the present disclosure can reduce the potential error source of manually taking and entering flow rate data into the controller.

The devices, systems, and methods of the present disclosure can also be utilized to retrofit existing liquid jet cutting systems. For example, the sensor assemblies can be attached between the local abrasive storage hopper and the abrasive material metering device upstream of the cutting head.

The devices, systems, and methods of the present disclosure can also facilitate manual operation. For example, the devices, systems, and methods of the present disclosure could be used in conjunction with controller settings for calibration. Calibration settings can include turning on abrasive material flow (e.g., without liquid flow) for a predetermined amount of time and catching and weighing the abrasive material. In some embodiments, the calibration settings can include turning on both the abrasive flow and high-pressure liquid flow (e.g., for a predetermined period of time) to calibrate the high-pressure liquid and abrasive flow rates. As used herein, "high-pressure" or similar terminology refers to systems configured to operate at pressures of greater than 10,000 psi, greater than 25,000 psi, greater than 50,000 psi, and/or greater than 100,000 psi. In some embodiments, "high-pressure" refers to pressures between 10,000-120,000 psi, between 25,000-100,000 psi, between 50,000-90,000 psi, and/or between 40,000-110,000 psi. The system could operate and deliver a flow rate either locally to a display or electrically to the controller. This flow rate could serve as the input to the cutting model (e.g., a CNC controller), either as manually-input flow rate or as an automatically-input flow rate.

As described above, for automatic operation, the controller could determine the duration of the next pierce or cut segment and, if long enough, initiate a measurement cycle to take place. This reading could be read by the controller and parameters could be adjusted in a CNC or other controller when using fixed orifice metering or be used to adjust and refine the flow rate of a variable abrasive feed device. The latter case could involve manual entry of a desired flow rate at the abrasive material controller or automatic entry of the required flow rate from a preestablished database or program.

Yet another advantage of the devices, systems, and methods of the present disclosure is that they can enable measurement intervals to be varied as many times as needed without interrupting the cut cycle or adding to overall cut time.

Furthermore, a source of operator error can be eliminated as the operator will no longer be required to manually weigh and enter abrasive data into a controller.

In another variation, the upstream shutoff valve can be cycled more rapidly than would normally be required for a full measurement cycle such that the top of the moving abrasive column moves past only one sensor of a multiple sensor system or partially by the sensing range of a single sensor as a means of verifying abrasive flow is occurring and to warn of a blockage in the abrasive feed system. This signal could communicate with the controller and provide an alarm to the user or trigger a shutdown of the system, which may include an automatic abrasive delivery system clearing cycle In another variation, the time between successive readings may be delayed sufficiently to allow abrasive material that have refilled the sensing column and possibly changed their physical properties, by the act of falling through an open space, to fully pass through the sensing section and or the metering assembly to further refine the accuracy of the measurements.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the devices, systems, and methods of the present disclosure are not intended to be exhaustive or to limit the present disclosure to the precise form disclosed above. While specific embodiments of, and examples for, the present disclosure are described above for illustrative purposes, various equivalent modifications are possible within the scope of the present disclosure, as those skilled in the relevant art will recognize. The teachings of the present disclosure provided herein can be applied to other systems, not necessarily the system described above. The elements and acts of the various embodiments described above can be combined to provide further embodiments. All of the above patents and applications and other references, including any that may be listed in accompanying filing papers, are incorporated herein by reference, and the appendix attached hereto forms part of the disclosure. Aspects of the present disclosure can be modified, if necessary, to employ the systems, functions, and concepts of the various references described above to provide yet further embodiments of the present disclosure.

These and other changes can be made to the present disclosure in light of the above Detailed Description. While the above description details certain embodiments of the devices, systems, and methods of the present disclosure and describes the best mode contemplated, no matter how detailed the above appears in text, the present disclosure can be practiced in many ways. Details of the system may vary considerably in its implementation details, while still being encompassed by the present disclosure disclosed herein. As noted above, particular terminology used when describing certain features or aspects of the present disclosure should not be taken to imply that the terminology is being redefined herein to be restricted to any specific characteristics, features, or aspects of the present disclosure with which that terminology is associated. In general, the terms used in the following claims should not be construed to limit the present disclosure to the specific embodiments disclosed in the specification, unless the above Detailed Description section explicitly defines such terms. Accordingly, the actual scope of the present disclosure encompasses not only the disclosed embodiments, but also all equivalent ways of practicing or implementing the present disclosure.

We claim:

1. An abrasive material delivery system for use with a liquid jet cutting system, the abrasive material delivery system comprising:
   a valve configured to adjust or stop an inflow of abrasive material into the abrasive material delivery system from a source of abrasive material;
   a chamber downstream of the valve and configured to receive the inflow of abrasive material from the valve;
   a metering component configured to control an outflow of abrasive from the chamber to a cutting head of the liquid jet cutting system;
   a sensor configured to monitor movement of a top surface of a portion of abrasive material within the chamber as the top surface moves through the chamber, wherein the sensor is configured to detect the top surface of the portion of abrasive material at a first location in the chamber and at a second location in the chamber downstream of the first location; and
   a processing device operably connected to the sensor and configured to determine an abrasive flow rate through the metering component based on a speed of the top surface as monitored by the sensor.

2. The abrasive material delivery system of claim 1 wherein the metering component includes an adjustable cross-section orifice.

3. The abrasive material delivery system of claim 1 wherein the abrasive material delivery system is a variable flow abrasive material delivery system.

4. The abrasive material delivery system of claim 1 wherein the abrasive material delivery system is configured to connect to an abrasive hopper.

5. The abrasive material delivery system of claim 1 wherein the valve is a pinch valve configured to flatten the top surface of the portion of abrasive material.

6. The abrasive material delivery system of claim 1 wherein the metering component includes one or more of a fluidizer, a wheel, a variable area, a pneumatic component, a vibratory feed component, or a fixed orifice.

7. The abrasive material delivery system of claim 1 wherein the chamber has a substantially uniform cross-section as measured perpendicular to a flow path of abrasive material through the chamber.

8. The abrasive material delivery system of claim 1 wherein the chamber is a portion of a tube having a constant cross-section.

9. The abrasive material delivery system of claim 1 wherein the valve is configured to close and thereby form the top surface of the portion of abrasive material, wherein the processing device determines the speed of the top surface based at least in part on the sensor sensing the top surface of the portion of abrasive material at the first location and the second location, and wherein the valve is further configured to open when the top surface of the portion of abrasive material passes the second location.

10. The abrasive material delivery system of claim 1 wherein the processing device is configured to determine the speed of the top surface of the abrasive material based on a period of time between detecting the top surface at the first location and detecting the top surface at the second location.

11. The abrasive material delivery system of claim 1 wherein the sensor is configured to start a timer when the sensor detects the top surface at the first location, and wherein the sensor is further configured to stop the timer when the sensor detects the top surface at the second location.

12. The abrasive material delivery system of claim 11 wherein the valve is configured to open when the timer is stopped.

13. The abrasive material delivery system of claim 11 wherein a volume of the chamber downstream of the second location is greater than a volume of the chamber between the first location and the second location.

14. The abrasive material delivery system of claim 1 wherein the sensor is configured to periodically monitor movement of the top surface of the abrasive material.

15. The abrasive material delivery system of claim 1 wherein the chamber has a larger cross-section at a downstream end of the chamber than at an upstream end of the chamber.

16. The abrasive material delivery system of claim 1 wherein the chamber has a bulged portion between the valve and the metering component.

17. An abrasive material delivery system for use with a liquid jet cutting system, the abrasive material delivery system comprising:
   a valve configured to adjust or stop an inflow of abrasive material into the abrasive material delivery system from a source of abrasive material;
   a chamber downstream of the valve and configured to receive the inflow of abrasive material from the valve;
   a metering component configured to control an outflow of abrasive material from the chamber to a cutting head of the liquid jet cutting system;
   a sensor configured to monitor movement of a top surface of a portion of abrasive material within the chamber as the top surface moves through the chamber; and
   a processing device operably connected to the sensor and configured to determine an abrasive flow rate through the metering component based on a speed of the top surface as monitored by the sensor.

18. The abrasive material delivery system of claim 17 wherein the chamber is configured to contain the inflow of abrasive material in the absence of liquid and provide the outflow of abrasive to the cutting head in the absence of liquid.

19. The abrasive material delivery system of claim 17 wherein the valve is configured to close and thereby form the top surface of the portion of abrasive material, wherein the processing device determines the speed of the top surface based at least in part on the sensor sensing the top surface of the portion of abrasive material at a first point in the chamber and at a second point in the chamber, and wherein the valve is further configured to open when the top surface of the portion of abrasive material passes the second point in the chamber.

20. The abrasive material delivery system of claim 17 wherein the sensor is configured to detect the top surface of the portion of abrasive material at a first location in the chamber and to detect the top surface of the portion of abrasive material at a second location downstream of the first location, and wherein the processing device is configured to determine the speed of the top surface of the abrasive material based on a period of time between detecting the top surface at the first location and detecting the top surface at the second location.

21. The abrasive material delivery system of claim 1, further comprising the cutting head, wherein the cutting head is configured to combine the outflow of abrasive material from the chamber with a high-pressure jet of liquid.

* * * * *